United States Patent
Siddiqui et al.

(10) Patent No.: US 9,868,799 B2
(45) Date of Patent: Jan. 16, 2018

(54) PROCATALYST FOR POLYMERIZATION OF OLEFINS

(71) Applicants: SAUDI BASIC INDUSTRIES CORPORATION, Riyadh (SA); SABIC GLOBAL TECHNOLOGIES B.V., Bergen op Zoom (NL)

(72) Inventors: Inaamul Haq Siddiqui, Riyadh (SA); Khalid Abdullah Al-Bahily, Riyadh (SA); Khalid Mohammed Al-Gahtani, Riyadh (SA)

(73) Assignees: SAUDI BASIC INDUSTRIES CORPORATION, Riyadh (SA); SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 15/104,808

(22) PCT Filed: Dec. 19, 2014

(86) PCT No.: PCT/EP2014/078798
§ 371 (c)(1),
(2) Date: Jun. 15, 2016

(87) PCT Pub. No.: WO2015/091984
PCT Pub. Date: Jun. 25, 2015

(65) Prior Publication Data
US 2016/0311945 A1    Oct. 27, 2016

Related U.S. Application Data

(60) Provisional application No. 61/935,070, filed on Feb. 3, 2014.

(30) Foreign Application Priority Data

Dec. 20, 2013  (EP) ..................... 13199166
Jun. 2, 2014    (EP) ..................... 14170827

(51) Int. Cl.
C08F 110/06    (2006.01)

(52) U.S. Cl.
CPC ................. C08F 110/06 (2013.01)

(58) Field of Classification Search
CPC .................................. C08F 110/06
See application file for complete search history.

(56) References Cited

U.S. PATENT DOCUMENTS

| | | |
|---|---|---|
| 4,384,087 A | 5/1983 | Capshew |
| 4,399,054 A | 8/1983 | Ferraris et al. |
| 4,414,132 A | 11/1983 | Goodall et al. |
| 4,472,524 A | 9/1984 | Albizzati |
| 5,077,357 A | 12/1991 | Job |
| 5,106,806 A | 4/1992 | Job |
| 5,556,820 A | 9/1996 | Funabashi et al. |
| 6,395,670 B1 | 5/2002 | Morini et al. |
| 9,663,596 B2 | 5/2017 | Taftaf et al. |
| 9,688,790 B2 | 6/2017 | Taftaf et al. |
| 2010/0130709 A1 | 5/2010 | Chen et al. |
| 2016/0311946 A1 | 10/2016 | Zuideveld et al. |
| 2016/0311950 A1 | 10/2016 | Batinas-Geurts et al. |
| 2016/0326280 A1 | 11/2016 | Batinas-Geurts et al. |
| 2016/0333121 A1 | 11/2016 | Batinas-Geurts et al. |
| 2016/0340293 A1 | 11/2016 | Taftaf et al. |

FOREIGN PATENT DOCUMENTS

| | | |
|---|---|---|
| EP | 398698 A2 | 11/1990 |
| EP | 1086961 A1 | 5/2001 |
| EP | 1283222 A1 | 2/2003 |
| EP | 1538167 A1 | 6/2005 |
| EP | 1783145 A1 | 5/2007 |
| EP | 1222214 B1 | 7/2007 |
| EP | 1862480 A1 | 12/2007 |
| EP | 1838741 B1 | 4/2011 |
| WO | 9632426 A1 | 10/1996 |
| WO | 9632427 A1 | 10/1996 |
| WO | 0123441 A1 | 4/2001 |
| WO | 2006010414 A1 | 2/2006 |
| WO | 2006056338 A1 | 6/2006 |
| WO | 2007134851 A1 | 11/2007 |
| WO | 2008-077770 A1 | 7/2008 |
| WO | 2011106494 A1 | 9/2011 |
| WO | 2011106497 A1 | 9/2011 |
| WO | 2011106500 A1 | 9/2011 |
| WO | 2014001257 A1 | 1/2014 |

OTHER PUBLICATIONS

International Search Report for PCT/EP2014/078798 dated Mar. 12, 2015, 4 pages.
Pullukat, Thomas and Hoff, Raymond E., "Silica-Based Ziegler-Natta Catalysts: A Patent Review", Catal. Rev, Sci. Eng. 41(3&4), 389-428 (1999).
Written Opinion of the International Searching Authority for PCT/EP2014/078798 dated Mar. 12, 2015, 6 pages.
International Search Report Authority for PCT/EP2014/078790 dated Mar. 17, 2015, 4 pages.
Written Opinion of the International Searching Authority for PCT/EP2014/078790 dated Mar. 17, 2015, 4 pages.
"Periodic System of the Elements," Handbook of Chemistry and Physics, CRC Press; 1989-1990, 70th Edition.

(Continued)

*Primary Examiner* — Catherine S Branch
(74) *Attorney, Agent, or Firm* — Cantor Colburn LLP

(57) ABSTRACT

The invention relates to a procatalyst for polymerization of olefins. The invention also relates to a process for preparing said procatalyst. Furthermore, the invention is directed to a catalyst system for polymerization of olefins comprising the said procatalyst, a co-catalyst and optionally an external electron donor; a process of preparing polyolefins by contacting an olefin with said catalyst system and to polyolefins obtained or obtainable by said process. The invention also relates to the use of said procatalyst in the polymerization of olefins.

9 Claims, No Drawings

(56) References Cited

OTHER PUBLICATIONS

Bartoli et al. "Convenient Procedure for the Reduction of p-Enamino Ketones: Synthesis of y-Amino Alcohols and Tetrahydro-I ,3-oxazines" Journal of the Chemical Society, Perkin Transactions 1, 1994; 537-543.
Emil White "Deamination of Amines. 2-Phenylethyl Benzoate Via the Nitrosoamide Decomposition" Organic Syntheses, 1967, 47, 44.
Non-Final Office Action dated Jul. 6, 2017; U.S. Appl. No. 15/104,822, filed Jun. 15, 2016.
Pasouini, N. (ed.) "Polypropylene handbook," Carl Hanser Verlag Munich; 2005, 11 Pages, 2nd edition, Chapter 6.2.
S. van der Ven, Polypropylene and other Polyolefins, Elsevier 1990, pp. 8-10.

PROCATALYST FOR POLYMERIZATION OF OLEFINS

This application is a national stage application of PCT/EP2014/078798 filed Dec. 19, 2014, which claims priority to European Application EP14170827.1 filed Jun. 2, 2014, U.S. Provisional Application 61/935,070 filed Feb. 3, 2014, and European Application EP13199166.3 filed Dec. 20, 2013, all of which are hereby incorporated by reference in their entirety.

BACKGROUND OF THE INVENTION

The invention relates to a procatalyst for polymerization of olefins. The invention also relates to a process for preparing said procatalyst. Furthermore, the invention is directed to a catalyst system for polymerization of olefins comprising the said procatalyst, a co-catalyst and optionally an external electron donor; a process of preparing polyolefins by contacting an olefin with said catalyst system. The invention also relates to the use of said procatalyst in the polymerization of olefins.

Catalyst systems and their components that are suitable for preparing a polyolefin are generally known. One type of such catalysts are generally referred to as Ziegler-Natta catalysts. The term "Ziegler-Natta" is known in the art and it typically refers to catalyst systems comprising a transition metal-containing solid catalyst compound (also typically referred to as a procatalyst); an organometallic compound (also typically referred to as a co-catalyst) and optionally one or more electron donor compounds (e.g. external electron donors).

The transition metal-containing solid catalyst compound comprises a transition metal halide (e.g. titanium halide, chromium halide, hafnium halide, zirconium halide, vanadium halide) supported on a metal or metalloid compound (e.g. a magnesium compound or a silica compound). An overview of such catalyst types is for example given by T. Pullukat and R. Hoff in Catal. Rev.—Sci. Eng. 41, vol. 3 and 4, 389-438, 1999. The preparation of such a procatalyst is for example disclosed in WO96/32427 A1 and EP 1 086 961.

There is, however, an on-going need in industry for catalysts showing better performance, especially better yield and higher polymer bulk density.

It is thus an object of the invention to provide a procatalyst for polymerization of olefins and a process to prepare such a procatalyst. It is a further object of the present invention is to provide a procatalyst which shows better performance, especially higher yield and higher polymer bulk density.

SUMMARY OF THE PRESENT INVENTION

One or more of the aforementioned objects of the present invention are achieved with a procatalyst that has been modified by using a group 13- or transition metal modifier.

The present invention is related to the addition of a modification step during the titanation step. A Group 13- or transition metal modifier is added during the titanation step of the preparation of the catalyst.

It has been surprisingly found by the present inventors that the procatalyst according to the present invention shows a better yield and higher bulk density, particularly—but not only—with homo polypropylene and better ethylene sensitivity for random polypropylene. The key to the present invention is the addition of a Group 13- or transition metal modifier during the titanation step.

In a first aspect, the present invention relates to a process for preparing a procatalyst suitable for preparing a catalyst composition for olefin polymerization, said process comprising the steps of:
i) contacting a compound $R^4_z MgX^4_{2-z}$ with an alkoxy- or aryloxy-containing silane compound to give a first intermediate reaction product, being a solid $Mg(OR^1)_x X^1_{2-x}$, wherein: $R^4$ is the same as $R^1$ being a linear, branched or cyclic hydrocarbyl group independently selected e.g. from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms and preferably has from 1 to 20 carbon atoms; $X^4$ and $X^1$ are each independently selected from the group of consisting of fluoride (F—), chloride (Cl—), bromide (Br—) or iodide (I—), preferably chloride; z is in a range of larger than 0 and smaller than 2, being $0<z<2$;
ii) optionally contacting the solid $Mg(OR^1)_x X^1_{2-x}$ obtained in step i) with at least one activating compound selected from the group formed by activating electron donors and metal alkoxide compounds of formula $M^1(OR^2)_{v-w}(OR^3)_w$ or $M^2(OR^2)_{v-w}(R^3)_w$, to obtain a second intermediate reaction product; wherein: $M^1$ is a metal selected from the group consisting of Ti, Zr, Hf, Al or Si; $M^2$ is a metal being Si; v is the valency of $M^1$ or $M^2$; $R^2$ and $R^3$ are each a linear, branched or cyclic hydrocarbyl group independently selected e.g. from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms, and preferably has from 1 to 20 carbon atoms;
iii) contacting the first or second intermediate reaction product obtained in step i) or ii) respectively, with a halogen-containing titanium compound and either an activator or an internal electron donor to obtain a third intermediate reaction product;
iv) modifying the third intermediate reaction product obtained in step iii) with a modifier having the formula $MX_3$, wherein M is a metal selected from the Group 13 metals and transition metals of the IUPAC periodic table of elements, and wherein X is a halide, to yield a modified intermediate reaction product;
v) contacting said modified intermediate reaction product obtained in step iv) with a halogen-containing titanium compound and in the case that in step iii) an activator was used an internal donor to obtain the procatalyst, wherein preferably step v) is carried out at least two times.

In an embodiment, when an activator is added during step iii), said activator is selected from the group of alkylbenzoate, benzamide, and monoester, preferably ethylbenzoate.

In an embodiment, when an activator is added during step iii) and an internal donor is added during step v), said activator is ethylbenzoate and said internal donor is 4-[benzoyl(methyl)amino]pentan-2-yl benzoate.

In an embodiment, during step iv) an aluminum halide, preferably aluminum trichloride, is used as the modifier.

In an embodiment, the compound of formula $R^4_z MgX^4_{2-z}$ used in step i), the halogen-containing titanium compound used in step iii) and step v) and the Group 13- or transition metal halide modifier used in step iv) are used in such amounts that the resulting procatalyst comprises in wt. % based on the total weight of the procatalyst:

magnesium: from 15 to 24, preferably from 19.0 to 19.5;
titanium: from 1 to 4, preferably from 1.5 to 3.5;
group 13- or transition metal: from 0.05 to 2.0, preferably from 0.1 to 0.4.

In an embodiment, step ii) is carried out using an combination of an alcohol and an tetra alkoxy titanium compound as the activating compounds. In an embodiment, step ii) is carried out using an combination of ethylalcohol and tetra ethoxy titanium as the activating compounds.

In an embodiment, steps iii), iv) and v) are carried out in the same reactor.

In an embodiment, the internal donor used during step iii) or step v) is selected from the group consisting of dicarboxylic acid esters (also called phthalates) according to Formula VI and aminobenzoates according to Formula XI:

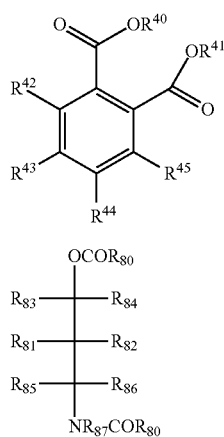

Formula VI

Formula XI wherein $R^{40}$ and $R^{41}$ are each independently a linear, branched or cyclic, and substituted or unsubstituted hydrocarbyl group selected from alkyl, alkenyl, aryl, aralkyl, alkoxycarbonyl or alkylaryl groups, and one or more combinations thereof, preferably having 1 and 10 carbon atoms; and wherein $R^{42}$, $R^{43}$, $R^{44}$, $R^{45}$ are each independently selected from hydrogen, a halide or a linear, branched or cyclic, and a substituted or unsubstituted hydrocarbyl group, e.g. selected from alkyl, alkenyl, aryl, aralkyl, alkoxycarbonyl or alkylaryl groups, and one or more combinations thereof, preferably having from 1 to 10 carbon atoms; preferably di-isobutyl phthalate.

wherein $R^{80}$ is a substituted or unsubstituted aromatic group, selected from aryl or alkylaryl groups, having from 6 to 20 carbon atoms; $R^{81}$, $R^{82}$, $R^{83}$, $R^{84}$, $R^{85}$, and $R^{86}$ are each independently selected from hydrogen or a linear, branched or cyclic, and substituted or unsubstituted hydrocarbyl group, e.g. selected from alkyl, alkenyl, aryl, aralkyl, alkoxycarbonyl or alkylaryl groups, and one or more combinations thereof, preferably having from 1 to 20 carbon atoms, preferably 4-[benzoyl(methyl)amino]pentan-2-yl benzoate.

In a second aspect, the present invention relates to a procatalyst comprising a titanium catalyst supported on a solid magnesium-containing support modified by group 13- or transition metal halide modifier, wherein the procatalyst comprises in wt. % based on the total weight of the procatalyst:
magnesium: from 15 to 24, preferably from 19.0 to 19.5;
titanium: from 1 to 4, preferably from 1.5 to 3.5;
Group 13- or transition metal: from 0.05 to 2.0, preferably from 0.1 to 0.4.

In an embodiment, the present invention relates to a procatalyst comprising a titanium catalyst supported on a solid magnesium-containing support modified by aluminum halide modifier, wherein the procatalyst comprises in wt. % based on the total weight of the procatalyst:
magnesium: from 19.0 to 19.5;
titanium: from 1.5 to 3.5;
aluminum: from 0.1 to 0.4.

In an embodiment, said procatalyst is obtainable by the process according to the present invention.

In another aspect, the present invention relates to a catalyst system suitable for olefin polymerization comprising the procatalyst according to the present invention or obtainable by the process according to the present invention and a co-catalyst and optionally an external electron donor.

In an embodiment, the co-catalyst is an organometallic compound containing a metal from group 1, 2, 12 or 13 of the Periodic System of the Elements.

In an embodiment, an external donor is present in the catalyst system according to the present invention and as said external electron donor an alkyl-alkoxysilane according to formula IV $((R^{92})Si(OR^{93})_3)$ is used, wherein the $R^{92}$ and $R^{93}$ groups are each independently a linear, branched or cyclic, substituted or unsubstituted alkyl having from 1 to 10 carbon atoms. Said external donor is preferably cyclohexylmethyldimethoxysilane (C-donor), n-propyltrimethoxysilane (nPTMS) or n-propyltriethyxosilane (nPTES).

In another aspect, the present invention relates to a process of preparing a polyolefin by contacting at least one olefin with a polymerization catalyst system according to the present invention.

In an embodiment, the olefin is propylene or a mixture of propylene and ethylene.

These aspects and embodiments will be described in more detail below.

The modification step according to the present invention allows to obtain catalyst composition providing a higher yield compared to non-modified catalyst composition.

DEFINITIONS

The following definitions are used in the present description and claims to define the stated subject matter. Other terms not cited below are meant to have the generally accepted meaning in the field.

"Ziegler-Natta catalyst" as used in the present description means: a transition metal-containing solid catalyst compound comprising a transition metal halide selected from titanium halide, chromium halide, hafnium halide, zirconium halide, and vanadium halide, supported on a metal or metalloid compound (e.g. a magnesium compound or a silica compound).

"Ziegler-Natta catalytic species" or "catalytic species" as used in the present description means: a transition metal-containing species comprises a transition metal halide selected from titanium halide, chromium halide, hafnium halide, zirconium halide and vanadium halide.

"internal donor" or "internal electron donor" or "ID" as used in the present description means: an electron-donating compound containing one or more atoms of oxygen (O) and/or nitrogen (N). This ID is used as a reactant in the preparation of a solid procatalyst. An internal donor is commonly described in prior art for the preparation of a solid-supported Ziegler-Natta catalyst system for olefins polymerization; i.e. by contacting a magnesium-containing support with a halogen-containing Ti compound and an internal donor.

"external donor" or "external electron donor" or "ED" as used in the present description means: an electron-donating compound used as a reactant in the polymerization of olefins. An ED is a compound added independent of the procatalyst. It is not added during procatalyst formation. It contains at least one functional group that is capable of donating at least one pair of electrons to a metal atom. The ED may influence catalyst properties, non-limiting examples thereof are affecting the stereoselectivity of the catalyst system in polymerization of olefins having 3 or more carbon atoms, hydrogen sensitivity, ethylene sensitivity, randomness of co-monomer incorporation and catalyst productivity.

"activator" as used in the present description means: an electron-donating compound containing one or more atoms of oxygen (O) and/or nitrogen (N) which is used during the synthesis of the procatalyst prior to or simultaneous with the addition of an internal donor.

"activating compound" as used in the present description means: a compound used to activate the solid support prior to contacting it with the catalytic species.

"modifier" or "Group 13- or transition metal modifier" as used in the present description means: a metal modifier comprising a metal selected from the metals of Group 13 of the IUPAC Periodic Table of elements and transition metals. Where in the description the terms metal modifier or metal-based modifier is used, Group 13- or transition metal modifier is meant.

"procatalyst" and "catalyst component" as used in the present description have the same meaning: a component of a catalyst composition generally comprising a solid support, a transition metal-containing catalytic species and optionally one or more internal donors.

"halide" as used in the present description means: an ion selected from the group of: fluoride (F—), chloride (Cl—), bromide (Br—) or iodide (I—).

"halogen" as used in the present description means: an atom selected from the group of: fluorine (F), chlorine (Cl), bromine (Br) or iodine (I).

"Heteroatom" as used in the present description means: an atom other than carbon or hydrogen. However, as used herein—unless specified otherwise, such as below,—when "one or more hetereoatoms" is used one or more of the following is meant: F, Cl, Br, I, N, O, P, B, S or Si.

"heteroatom selected from group 13, 14, 15, 16 or 17 of the IUPAC Periodic Table of the Elements" as used in the present description means: a hetero atom selected from B, Al, Ga, In, Tl [Group 13], Si, Ge, Sn, Pb [Group 14], N, P, As, Sb, Bi [Group 15], O, S, Se, Te, Po [Group 16], F, Cl, Br, I, At [Group 17].

"hydrocarbyl" as used in the present description means: is a substituent containing hydrogen and carbon atoms, or linear, branched or cyclic saturated or unsaturated aliphatic radical, such as alkyl, alkenyl, alkadienyl and alkynyl; alicyclic radical, such as cycloalkyl, cycloalkadienyl cycloalkenyl; aromatic radical, such as monocyclic or polycyclic aromatic radical, as well as combinations thereof, such as alkaryl and aralkyl.

"substituted hydrocarbyl" as used in the present description means: is a hydrocarbyl group that is substituted with one or more non-hydrocarbyl substituent groups. A non-limiting example of a non-hydrocarbyl substituent is a heteroatom. Examples are alkoxycarbonyl (viz. carboxylate) groups. When in the present description "hydrocarbyl" is used it can also be "substituted hydrocarbyl", unless stated otherwise.

"alkyl" as used in the present description means: an alkyl group being a functional group or side-chain consisting of carbon and hydrogen atoms having only single bonds. An alkyl group may be straight or branched and may be un-substituted or substituted. It may or may not contain heteroatoms, such as oxygen (O), nitrogen (N), phosphorus (P), silicon (Si) or sulfur (S). An alkyl group also encloses aralkyl groups wherein one or more hydrogen atoms on the alkyl group have been replaced by aryl groups.

"aryl" as used in the present description means: an aryl group being a functional group or side-chain derived from an aromatic ring. An aryl group and may be un-substituted or substituted with straight or branched hydrocarbyl groups. It may or may not contain heteroatoms, such as oxygen (O), nitrogen (N), phosphorus (P), silicon (Si) or sulfur (S). An aryl group also encloses alkaryl groups wherein one or more hydrogen atoms on the aromatic ring have been replaced by alkyl groups.

"alkoxide" or "alkoxy" as used in the present description means: a functional group or side-chain obtained from a alkyl alcohol. It consist of an alkyl bonded to a negatively charged oxygen atom.

"aryloxide" or "aryloxy" or "phenoxide" as used in the present description means: a functional group or side-chain obtained from an aryl alcohol. It consist of an aryl bonded to a negatively charged oxygen atom.

"Grignard reagent" or "Grignard compound" as used in the present description means: a compound or a mixture of compounds of formula $R^4_z MgX^4_{2-z}$ ($R^4$, z, and $X^4$ are as defined below) or it may be a complex having more Mg clusters, e.g. $R_4Mg_3Cl_2$.

"polymer" as used in the present description means: a chemical compound comprising repeating structural units, wherein the structural units are monomers.

"olefin" as used in the present description means: an alkene.

"olefin-based polymer" or "polyolefin" as used in the present description means: a polymer of one or more alkenes.

"propylene-based polymer" as used in the present description means: a polymer of propylene and optionally a comonomer.

"polypropylene" as used in the present description means: a polymer of propylene.

"copolymer" as used in the present description means: a polymer prepared from two or more different monomers.

"monomer" as used in the present description means: a chemical compound that can undergo polymerization.

"thermoplastic" as used in the present description means: capable of softening or fusing when heated and of hardening again when cooled.

"polymer composition" as used in the present description means: a mixture of either two or more polymers or of one or more polymers and one or more additives.

"$M_w$" and "$M_n$" in the context of the present invention means the ratio of the weight average molecular weight $M_w$ and the number average molecular weight $M_n$ of a sample, as measured according to ASTM D6474-12.

"PDI" in the context of the present invention means the ratio of the weight average molecular weight $M_w$ and the number average molecular weight $M_n$ of a sample, as measured according to ASTM D6474-12. As used herein, the terms "PDI" and "polydispersity index" are interchangeable.

"MWD" in the context of the present invention means distribution of the molecular weight of a sample, as represented by the ratio of the weight average molecular weight $M_w$ and the number average molecular weight $M_n$ of a sample as measured according to ASTM D6474-12. As used herein, the terms "MWD" and "molecular weight distribution" are interchangeable.

"XS" or "xylene soluble fraction" as used in the present description means: the xylene soluble fraction in terms of percentage of polymer that does not precipitate out upon cooling of a polymer solution in xylene, said polymer solution having been subjected to reflux conditions, down from the reflux temperature, which equals the boiling temperature of xylene, to 25° C. XS is measured according to ASTM D5492-10. As used herein, the terms "XS" and "xylene soluble fraction" are interchangeable.

"polymerization conditions" as used in the present description means: temperature and pressure parameters within a polymerization reactor suitable for promoting polymerization between the catalyst composition and an olefin to form the desired polymer. These conditions depend on the type of polymerization used.

"production rate" or "yield" as used in the present description means: the amount of kilograms of polymer produced per gram of catalyst composition consumed in the polymerization reactor per hour, unless stated otherwise.

"bulk density" as used in the present description means: the weight per unit volume of a material, including voids inherent in the material as tested. Bulk density is measured as apparent density according to ASTM D1895-96 Reapproved 2010-e1, test method A.

Unless stated otherwise, when it is stated that any R group is "independently selected from" this means that when several of the same R groups are present in a molecule they may have the same meaning of they may not have the same meaning. For example, for the compound $R_2M$, wherein R is independently selected from ethyl or methyl, both R groups may be ethyl, both R groups may be methyl or one R group may be ethyl and the other R group may be methyl.

DETAILED DESCRIPTION OF THE INVENTION

The present invention is described below in more detail. All embodiments described with respect to one aspect are also applicable to the other aspects of the invention, unless otherwise stated.

As stated above, the procatalyst according to the present invention shows a better yield and higher bulk density, particularly with homo polypropylene and shows better ethylene sensitivity for random polypropylene. The present inventors have observed that the catalyst performance has been improved by using Group 13- or transition metal modifiers.

Without wishing to be bound by any theory, it is assumed by the present inventors that this increase in catalyst performance is the result of an increase in the active site acidity leading to a higher activity for e.g. homo polypropylene and an a better ethylene sensitivity for random polypropylene production.

Another advantage of the present invention is that a lower amount of catalyst residues are present in the polyolefin obtained and that due to the higher yield the costs for the catalyst are reduced.

The procatalyst may be produced by any method known in the art.

The procatalyst may also be produced as disclosed in WO96/32426A; this document discloses a process for the polymerization of propylene using a catalyst comprising a catalyst component obtained by a process wherein a compound with formula $Mg(OAlk)_xCl_y$ wherein x is larger than 0 and smaller than 2, y equals 2-x and each Alk, independently, represents an alkyl group, is contacted with a titanium tetraalkoxide and/or an alcohol in the presence of an inert dispersant to give an intermediate reaction product and wherein the intermediate reaction product is contacted with titanium tetrachloride in the presence of an internal donor, which is di-n-butyl phthalate (DBP).

Preferably, the Ziegler-Natta type procatalyst in the catalyst system according to the present invention is obtained by the process as described in WO 2007/134851 A1. In Example I the process is disclosed in more detail. Example I including all sub-examples (IA-IE) of WO 2007/134851 A1 is incorporated into the present description. More details about the different embodiments are disclosed starting on page 3, line 29 to page 14 line 29 of WO 2007/134851 A1. These embodiments are incorporated by reference into the present description.

In the following part of the description the different steps and phases of the process for preparing the procatalyst according to the present invention will be discussed.

The process for preparing a procatalyst according to the present invention comprises the following phases:

Phase A): preparing a solid support for the procatalyst;
Phase B): optionally activating said solid support obtained in phase A) using one or more activating compounds to obtain an activated solid support;
Phase C): contacting said solid support obtained in phase A) or said activated solid support in phase B) with a catalytic species wherein phase C) comprises one of the following:
  contacting said solid support obtained in phase A) or said activated solid support in phase B) with a catalytic species and one or more internal donors to obtain an intermediate product; or
  contacting said solid support obtained in phase A) or said activated solid support in phase B) with a catalytic species and an activator to obtain an intermediate product;
Phase D: modifying said intermediate product obtained in phase C) wherein phase D) comprises on of the following:
  modifying said intermediate product obtained in phase C) with a Group 13- or transition metal modifier in case an internal donor was used during phase C), in order to obtain a procatalyst;
  modifying said intermediate product obtained in phase C) with a Group 13- or transition metal modifier and one or more internal donors in case an activator was used during phase C), in order to obtain a procatalyst.

The procatalyst thus prepared can be used in polymerization of olefins using an external donor and a co-catalyst.

The various steps used to prepare the catalyst according to the present invention (and the prior art) are described in more detail below.

The catalyst according to the present invention thus prepared—being a metal-modified catalyst—can be used in polymerization of olefins using an external donor and a co-catalyst.

It is thus noted that the process according to the present invention is different from the prior art process by the step of modification of the supported catalyst. The various steps used to prepare the catalyst according to the present invention (and the prior art) are described in more detail below.

In a first specific embodiment, the process for preparing a procatalyst according to the present invention comprises phase A: preparing a solid support for the catalyst; phase B: activating said solid support for the catalyst; phase C: contacting said solid support with the catalytic species and an phthalate internal donor; phase D: modifying said catalyst with a Group 13- or transition metal modifier.

In a second specific embodiment, the process for preparing a procatalyst according to the present invention comprises the following phases: phase A: preparing a solid support for the catalyst; phase B: activating said solid support for the catalyst; phase C: contacting said solid support with the catalytic species and an activator selected from the group consisting of alkylbenzoate and monoesters; phase D: modifying said catalyst with a Group 13- or transition metal modifier and aminobenzoate internal donor. Using the second embodiment a phthalate free procatalyst can be obtained.

Phase A: Preparing a Solid Support for the Catalyst

In the process of the present invention preferably a magnesium-containing support is used. Said magnesium-containing support is known in the art as a typical component of a Ziegler-Natta procatalyst. This step of preparing a solid support for the catalyst is the same as in the prior art process. The following description explains the process of preparing magnesium-based support. Other supports may be used.

Synthesis of magnesium-containing supports, such as magnesium halides, magnesium alkyls and magnesium aryls, and also magnesium alkoxy and magnesium aryloxy compounds for polyolefin production, particularly of polypropylenes production are described for instance in U.S. Pat. No. 4,978,648, WO96/32427A1, WO01/23441 A1, EP1283 222A1, EP1222 214B1; U.S. Pat. No. 5,077,357; U.S. Pat. No. 5,556,820; U.S. Pat. No. 4,414,132; U.S. Pat. No. 5,106,806 and U.S. Pat. No. 5,077,357 but the present process is not limited to the disclosure in these documents.

Preferably, the process for preparing the solid support for the procatalyst according to the present invention comprises the following steps: step o) which is optional and step i).

Step o) Preparation of the Grignard Reagent (Optional)

A Grignard reagent, $R^4_z MgX^4_{2-z}$ used in step i) may be prepared by contacting metallic magnesium with an organic halide $R^4X^4$, as described in WO 96/32427 A1 and WO01/23441 A1. All forms of metallic magnesium may be used, but preferably use is made of finely divided metallic magnesium, for example magnesium powder. To obtain a fast reaction it is preferable to heat the magnesium under nitrogen prior to use.

$R^4$ is a hydrocarbyl group independently selected e.g. from alkyl, alkenyl, aryl, aralkyl, alkylaryl, or alkoxycarbonyl groups, wherein said hydrocarbyl group may be linear, branched or cyclic, and may be substituted or unsubstituted; said hydrocarbyl group preferably having from 1 to 20 carbon atoms or combinations thereof. The $R^4$ group may contain one or more heteroatoms.

$X^4$ is selected from the group of consisting of fluoride (F—), chloride (Cl—), bromide (Br—) or iodide (I—). The value for z is in a range of larger than 0 and smaller than 2: $0 < z < 2$ Combinations of two or more organic halides $R^4X^4$ can also be used.

The magnesium and the organic halide $R^4X^4$ can be reacted with each other without the use of a separate dispersant; the organic halide $R^4X^4$ is then used in excess.

The organic halide $R^4X^4$ and the magnesium can also be brought into contact with one another and an inert dispersant. Examples of these dispersants are: aliphatic, alicyclic or aromatic dispersants containing from 4 up to 20 carbon atoms.

Preferably, in this step o) of preparing $R^4_z MgX^4_{2-z}$, also an ether is added to the reaction mixture. Examples of ethers are: diethyl ether, diisopropyl ether, dibutyl ether, diisobutyl ether, diisoamyl ether, diallyl ether, tetrahydrofuran and anisole. Dibutyl ether and/or diisoamyl ether are preferably used. Preferably, an excess of chlorobenzene is used as the organic halide $R^4X^4$. Thus, the chlorobenzene serves as dispersant as well as organic halide $R^4X^4$.

The organic halide/ether ratio acts upon the activity of the procatalyst. The chlorobenzene/dibutyl ether volume ratio may for example vary from 75:25 to 35:65, preferably from 70:30 to 50:50.

Small amounts of iodine and/or alkyl halides can be added to cause the reaction between the metallic magnesium and the organic halide $R^4X^4$ to proceed at a higher rate. Examples of alkyl halides are butyl chloride, butyl bromide and 1,2-dibromoethane. When the organic halide $R^4X^4$ is an alkyl halide, iodine and 1,2-dibromoethane are preferably used.

The reaction temperature for step o) of preparing $R^4_z MgX^4_{2-z}$ normally is from 20 to 150° C.; the reaction time is normally from 0.5 to 20 hours. After the reaction for preparing $R^4_z MgX^4_{2-z}$ is completed, the dissolved reaction product may be separated from the solid residual products. The reaction may be mixed. The stirring speed can be determined by a person skilled in the art and should be sufficient to agitate the reactants.

Step i) Reacting a Grignard Compound with a Silane Compound

Step i): contacting a compound $R^4_z MgX^4_{2-z}$—wherein $R_4$, $X^4$, and z are as discussed above—with an alkoxy- or aryloxy-containing silane compound to give a first intermediate reaction product. Said first intermediate reaction product is a solid magnesium-containing support. It should be noted that with "alkoxy- or aryloxy-containing" is meant —$OR^1$ containing. In other words said alkoxy- or aryloxy-containing silane compound comprises at least one —$OR^1$ group. $R^1$ is selected from the group consisting of a linear, branched or cyclic hydrocarbyl group independently selected e.g. from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms and preferably has from 1 to 20 carbon atoms.

In step i) a first intermediate reaction product is thus prepared by contacting the following reactants: * a Grignard reagent—being a compound or a mixture of compounds of formula $R^4_z MgX^4_{2-z}$ and * an alkoxy- or aryloxy-containing silane compound. Examples of these reactants are disclosed for example in WO 96/32427 A1 and WO01/23441 A1.

The compound $R^4_z MgX^4_{2-z}$ used as starting product is also referred to as a Grignard compound. In $R^4_z MgX^4_{2-z}$, $X^4$ is preferably chloride or bromide, more preferably chloride.

$R^4$ can be an alkyl, aryl, aralkyl, alkoxide, phenoxide, etc., or mixtures thereof. Suitable examples of group $R^4$ are methyl, ethyl, n-propyl, i-propyl, n-butyl, i-butyl, t-butyl, hexyl, cyclohexyl, octyl, phenyl, tolyl, xylyl, mesityl, benzyl, phenyl, naphthyl, thienyl, indolyl. In a preferred embodiment of the invention, $R^4$ represents an aromatic group, for instance a phenyl group.

Preferably, as Grignard compound $R^4_z MgX^4_{2-z}$ used in step i) a phenyl Grignard or a butyl Grignard is used. The selection for either the phenyl Grignard or the butyl Grignard depends on the requirements.

When Grignard compound is used, a compound according to the formula $R^4_zMgX^4_{2-z}$ is meant. When phenyl Grignard is used a compound according to the formula $R^4_zMgX^4_{2-z}$ wherein $R^4$ is phenyl, e.g. PhMgCl, is meant. When butyl Grignard is used, a compound according to the formula $R^4_zMgX^4_{2-z}$ wherein $R^4$ is butyl, e.g. BuMgCl or n-BuMgCl, is meant.

An advantage of the use of phenyl Grignard are that it is more active that butyl Grignard. Preferably, when butyl Grignard is used, an activation step using an aliphatic alcohol, such as methanol is carried out in order to increase the activity. Such an activation step may not be required with the use of phenyl Grignard. A disadvantage of the use of phenyl Grignard is that benzene rest products may be present and that it is more expensive and hence commercially less interesting.

An advantage of the use of butyl Grignard is that it is benzene free and is commercially more interesting due to the lower price. A disadvantage of the use of butyl Grignard is that in order to have a high activity, an activation step is required.

The process to prepare the procatalyst according to the present invention can be carried out using any Grignard compound, but the two stated above are the two that are most preferred.

In the Grignard compound of formula $R^4_zMgX^4_{2-z}$ z is preferably from about 0.5 to 1.5.

The compound $R^4_zMgX^4_{2-z}$ may be prepared in an optional step (step o) which is discussed above), preceding step i) or may be obtained from a different process.

It is explicitly noted that it is possible that the Grignard compound used in step i) may alternatively have a different structure, for example, may be a complex. Such complexes are already known to the skilled person in the art; a particular example of such complexes is $Phenyl_4Mg_3Cl_2$.

The alkoxy- or aryloxy-containing silane used in step i) is preferably a compound or a mixture of compounds with the general formula $Si(OR^5)_{4-n}R^6_n$.

Wherein it should be noted that the $R^5$ group is the same as the $R^1$ group. The $R^1$ group originates from the $R^5$ group during the synthesis of the first intermediate reaction product.

$R^5$ is a hydrocarbyl group independently selected e.g. from alkyl, alkenyl, aryl, aralkyl, alkoxycarbonyl or alkylaryl groups, and one or more combinations thereof. Said hydrocarbyl group may be linear, branched or cyclic. Said hydrocarbyl group may be substituted or unsubstituted. Said hydrocarbyl group may contain one or more heteroatoms. Preferably, said hydrocarbyl group has from 1 to 20 carbon atoms, more preferably from 1 to 12 carbon atoms, even more preferably from 1 to 6 carbon atoms. Preferably, said hydrocarbyl group is an alkyl group, preferably having from 1 to 20 carbon atoms, more preferably from 1 to 12 carbon atoms, even more preferably from 1 to 6 carbon atoms, such as for example methyl, ethyl, n-propyl, isopropyl, n-butyl, sec-butyl, iso-butyl, t-butyl, pentyl or hexyl; most preferably, selected from ethyl and methyl.

$R^6$ is a hydrocarbyl group independently selected e.g. from alkyl, alkenyl, aryl, aralkyl, alkoxycarbonyl or alkylaryl groups, and one or more combinations thereof. Said hydrocarbyl group may be linear, branched or cyclic. Said hydrocarbyl group may be substituted or unsubstituted. Said hydrocarbyl group may contain one or more heteroatoms. Preferably, said hydrocarbyl group has from 1 to 20 carbon atoms, more preferably from 1 to 12 carbon atoms, even more preferably from 1 to 6 carbon atoms. Preferably, said hydrocarbyl group is an alkyl group, preferably having from 1 to 20 carbon atoms, more preferably from 1 to 12 carbon atoms, even more preferably from 1 to 6 carbon atoms, such as for example methyl, ethyl, n-propyl, isopropyl, n-butyl, sec-butyl, iso-butyl, t-butyl, or cyclopentyl.

The value for n is in the range of 0 up to 4, preferably n is from 0 up to and including 1.

Examples of suitable silane-compounds include tetramethoxysilane, tetraethoxysilane, methyltrimethoxysilane, methyltributoxysilane, phenyltriethoxy-silane, diethyldiphenoxysilane, n-propyltriethoxysilane, diisopropyldimethoxysilane, diisobutyldimethoxysilane, n-propyltrimethoxysilane, cyclohexyl-methyldimethoxysilane, dicyclopentyldimethoxy-silane, isobutylisopropyldimethoxyl-silane, phenyl-trimethoxysilane, diphenyl-dimethoxysilane, trifluoropropylmethyl-dimethoxysilane, bis(perhydroisoquinolino)-dimethoxysilane, dicyclohexyldimethoxysilane, dinorbornyl-dimethoxysilane, di(n-propyl)dimethoxysilane, di(iso-propyl)-dimethoxysilane, di(n-butyl)dimethoxysilane and/or di(iso-butyl)dimethoxysilane.

Preferably, tetraethoxy-silane is used as silane-compound in preparing the solid Mg-containing compound during step i) in the process according to the present invention.

Preferably, in step i) the silane-compound and the Grignard compound are introduced simultaneously to a mixing device to result in particles of the first intermediate reaction product having advantageous morphology. This is for example described in WO 01/23441 A1. Here, 'morphology' does not only refer to the shape of the particles of the solid Mg-compound and the catalyst made therefrom, but also to the particle size distribution (also characterized as span, viz. an indicator for the width of the particle size distribution as measured according to ISO 13320:2009), its fines content, powder flowability, and the bulk density of the catalyst particles. Moreover, it is well known that a polyolefin powder produced in polymerization process using a catalyst system based on such procatalyst has a similar morphology as the procatalyst (the so-called "replica effect"; see for instance S. van der Ven, Polypropylene and other Polyolefins, Elsevier 1990, p. 8-10). Accordingly, almost round polymer particles are obtained with a length/diameter ratio (l/D) smaller than 2 and with good powder flowability.

As discussed above, the reactants are preferably introduced simultaneously. With "introduced simultaneously" is meant that the introduction of the Grignard compound and the silane-compound is done in such way that the molar ratio Mg/Si does not substantially vary during the introduction of these compounds to the mixing device, as described in WO 01/23441 A1.

The silane-compound and Grignard compound can be continuously or batch-wise introduced to the mixing device. Preferably, both compounds are introduced continuously to a mixing device.

The mixing device can have various forms; it can be a mixing device in which the silane-compound is premixed with the Grignard compound, the mixing device can also be a stirred reactor, in which the reaction between the compounds takes place. The separate components may be dosed to the mixing device by means of peristaltic pumps.

Preferably, the compounds are premixed before the mixture is introduced to the reactor for step i). In this way, a procatalyst is formed with a morphology that leads to polymer particles with the best morphology (high bulk density, narrow particle size distribution, (virtually) no fines, excellent flowability).

The Si/Mg molar ratio during step i) may range from 0.2 to 20. Preferably, the Si/Mg molar ratio is from 0.4 to 1.0.

The period of premixing of the reactants in above indicated reaction step may vary between wide limits, for instance 0.1 to 300 seconds. Preferably, premixing is performed during 1 to 50 seconds.

The temperature during the premixing step of the reactants is not specifically critical, and may for instance range from 0 to 80° C.; preferably the temperature is from 10° C. to 50° C.

The reaction between said reactants may, for instance, take place at a temperature from −20° C. to 100° C.; for example at a temperature of from 0° C. to 80° C. The reaction time is for example from 1 to 5 hours.

The mixing speed during the reaction depends on the type of reactor used and the scale of the reactor used. The mixing speed can be determined by a person skilled in the art. As a non-limiting example, mixing may be carried out at a mixing speed of from 250 to 300 rpm. In an embodiment, when a blade stirrer is used the mixing speed is from 220 to 280 rpm and when a propeller stirrer is used the mixing speed is from 270 to 330 rpm. The stirrer speed may be increased during the reaction. For example, during the dosing, the speed of stirring may be increased every hour by 20-30 rpm.

Preferably PhMgCl is the Grignard agent used in step i).

The first intermediate reaction product obtained from the reaction between the silane compound and the Grignard compound is usually purified by decanting or filtration followed by rinsing with an inert solvent, for instance a hydrocarbon solvent with for example 1-20 carbon atoms, like pentane, iso-pentane, hexane or heptane. The solid product can be stored and further used as a suspension in said inert solvent. Alternatively, the product may be dried, preferably partly dried, and preferably under mild conditions; e.g. at ambient temperature and pressure.

The first intermediate reaction product obtained by this step i) may comprise a compound of the formula $Mg(OR^1)_x X^1_{2-x}$, wherein:

$R^1$ is a hydrocarbyl group independently selected e.g. from alkyl, alkenyl, aryl, aralkyl, alkoxycarbonyl or alkylaryl groups, and one or more combinations thereof. Said hydrocarbyl group may be linear, branched or cyclic. Said hydrocarbyl group may be substituted or unsubstituted. Said hydrocarbyl group may contain one or more heteroatoms. Preferably, said hydrocarbyl group has from 1 to 20 carbon atoms, more preferably from 1 to 12 carbon atoms, even more preferably from 1 to 6 carbon atoms. Preferably, said hydrocarbyl group is an alkyl group, preferably having from 1 to 20 carbon atoms, more preferably from 1 to 12 carbon atoms, even more preferably from 1 to 6 carbon atoms. Most preferably selected from ethyl and methyl.

$X^1$ is selected from the group of consisting of fluoride (F—), chloride (Cl—), bromide (Br—) or iodide (I—). Preferably, $X^1$ is chloride or bromine and more preferably, $X^1$ is chloride.

The value for x is in the range of larger than 0 and smaller than 2: $0<z<2$. The value for x is preferably from 0.5 to 1.5.

Phase B: Activating Said Solid Support for the Catalyst

This step of activating said solid support for the catalyst is an optional step that is not required, but is preferred, in the present invention. If this step of activation is carried out, preferably, the process for activating said solid support comprises the following step ii). This phase may comprise one or more stages.

Step ii) Activation of the Solid Magnesium Compound

Step ii): contacting the solid $Mg(OR^1)_x X^1_{2-x}$ with at least one activating compound selected from the group formed by activating electron donors and metal alkoxide compounds of formula $M^1(OR^2)_{v-w}(OR^3)_w$ or $M^2(OR^2)_{v-w}(R^3)_w$, wherein:

$R^2$ is a hydrocarbyl group independently selected e.g. from alkyl, alkenyl, aryl, aralkyl, alkoxycarbonyl or alkylaryl groups, and one or more combinations thereof. Said hydrocarbyl group may be linear, branched or cyclic. Said hydrocarbyl group may be substituted or unsubstituted. Said hydrocarbyl group may contain one or more heteroatoms. Preferably, said hydrocarbyl group has from 1 to 20 carbon atoms, more preferably from 1 to 12 carbon atoms, even more preferably from 1 to 6 carbon atoms. Preferably, said hydrocarbyl group is an alkyl group, preferably having from 1 to 20 carbon atoms, more preferably from 1 to 12 carbon atoms, even more preferably from 1 to 6 carbon atoms, such as for example methyl, ethyl, n-propyl, isopropyl, n-butyl, sec-butyl, iso-butyl, t-butyl, pentyl or hexyl; most preferably selected from ethyl and methyl.

$R^3$ is a hydrocarbyl group independently selected e.g. from alkyl, alkenyl, aryl, aralkyl, alkoxycarbonyl or alkylaryl groups, and one or more combinations thereof. Said hydrocarbyl group may be linear, branched or cyclic. Said hydrocarbyl group may be substituted or unsubstituted. Said hydrocarbyl group may contain one or more heteroatoms. Preferably, said hydrocarbyl group has from 1 to 20 carbon atoms, more preferably from 1 to 12 carbon atoms, even more preferably from 1 to 6 carbon atoms. Preferably, said hydrocarbyl group is an alkyl group, preferably having from 1 to 20 carbon atoms, more preferably from 1 to 12 carbon atoms, even more preferably from 1 to 6 carbon atoms; most preferably selected from methyl, ethyl, n-propyl, isopropyl, n-butyl, sec-butyl, iso-butyl, t-butyl, and cyclopentyl.

$M^1$ is a metal selected from the group consisting of Ti, Zr, Hf, Al or Si; v is the valency of $M^1$; $M^2$ is a metal being Si; v is the valency of $M^2$ and w is smaller than v.

The electron donors and the compounds of formula $M(OR^2)_{v-w}(OR^3)_w$ and $M(OR^2)_{v-w}(R^3)_w$ may be also referred herein as activating compounds.

In this step either one or both types of activating compounds (viz. activating electron donor or metal alkoxides) may be used.

The advantage of the use of this activation step prior to contacting the solid support with the halogen-containing titanium compound (process phase C) is that a higher yield of polyolefins is obtained per gram of the procatalyst. Moreover, the ethylene sensitivity of the catalyst system in the copolymerization of propylene and ethylene is also increased because of this activation step. This activation step is disclosed in detail in WO2007/134851 of the present applicant.

Examples of suitable activating electron donors that may be used in step ii) are known to the skilled person and described herein below, i.e. include carboxylic acids, carboxylic acid anhydrides, carboxylic acid esters, carboxylic acid halides, alcohols, ethers, ketones, amines, amides, nitriles, aldehydes, alkoxides, sulfonamides, thioethers, thioesters and other organic compounds containing one or more hetero atoms, such as nitrogen, oxygen, sulfur and/or phosphorus.

Preferably, an alcohol is used as the activating electron donor in step ii). More preferably, the alcohol is a linear or branched aliphatic or aromatic alcohol having 1-12 carbon atoms. Even more preferably, the alcohol is selected from methanol, ethanol, butanol, isobutanol, hexanol, xylenol and benzyl alcohol. Most preferably, the alcohol is ethanol or methanol, preferably ethanol.

Suitable carboxylic acids as activating electron donor may be aliphatic or (partly) aromatic. Examples include formic acid, acetic acid, propionic acid, butyric acid, isobutanoic acid, acrylic acid, methacrylic acid, maleic acid, fumaric acid, tartaric acid, cyclohexanoic monocarboxylic acid, cis-1,2-cyclohexanoic dicarboxylic acid, phenylcarboxylic acid, toluenecarboxylic acid, naphthalene carboxylic acid, phthalic acid, isophthalic acid, terephthalic acid and/or trimellitic acid.

Anhydrides of the aforementioned carboxylic acids can be mentioned as examples of carboxylic acid anhydrides, such as for example acetic acid anhydride, butyric acid anhydride and methacrylic acid anhydride.

Suitable examples of esters of above-mentioned carboxylic acids are formates, for instance, butyl formate; acetates, for instance ethyl acetate and butyl acetate; acrylates, for instance ethyl acrylate, methyl methacrylate and isobutyl methacrylate; benzoates, for instance methylbenzoate and ethylbenzoate; methyl-p-toluate; ethyl-naphthate and phthalates, for instance monomethyl phthalate, dibutyl phthalate, diisobutyl phthalate, diallyl phthalate and/or diphenyl phthalate.

Examples of suitable carboxylic acid halides as activating electron donors are the halides of the carboxylic acids mentioned above, for instance acetyl chloride, acetyl bromide, propionyl chloride, butanoyl chloride, butanoyl iodide, benzoyl bromide, p-toluyl chloride and/or phthaloyl dichloride.

Suitable alcohols are linear or branched aliphatic alcohols with 1-12 C-atoms, or aromatic alcohols. Examples include methanol, ethanol, butanol, isobutanol, hexanol, xylenol and benzyl alcohol. The alcohols may be used alone or in combination. Preferably, the alcohol is ethanol or hexanol.

Examples of suitable ethers are diethers2-ethyl-2-butyl-1,3-dimethoxypropane, 2-isopropyl-2-isopentyl-1,3-dimethoxypropane and/or 9,9-bis(methoxymethyl) fluorene. Also, cyclic ethers like tetrahydrofuran (THF), or tri-ethers can be used.

Suitable examples of other organic compounds containing a heteroatom for use as activating electron donor include 2,2,6,6-tetramethyl piperidine, 2,6-dimethylpiperidine, pyridine, 2-methylpyridine, 4-methylpyridine, imidazole, benzonitrile, aniline, diethylamine, dibutylamine, dimethylacetamide, thiophenol, 2-methyl thiophene, isopropyl mercaptan, diethylthioether, diphenylthioether, tetrahydrofuran, dioxane, dimethylether, diethylether, anisole, acetone, triphenylphosphine, triphenylphosphite, diethylphosphate and/or diphenylphosphate.

Examples of suitable metal alkoxides for use in step ii) are metal alkoxides of formulas: $M^1(OR^2)_{v-w}(OR^3)_w$ and $M^2(OR^2)_{v-w}(R^3)_w$, wherein $M^1$, $M^2$, $R^2$, $R^3$, v, and w are as defined herein. $R^2$ and $R^3$ can also be aromatic hydrocarbon groups, optionally substituted with e.g. alkyl groups and can contain for example from 6 to 20 carbon atoms. The $R^2$ and $R^3$ preferably comprise 1-12 or 1-8 carbon atoms. In preferred embodiments $R^2$ and $R^3$ are ethyl, propyl or butyl; more preferably all groups are ethyl groups.

Preferably, $M^1$ in said activating compound is Ti or Si. Si-containing compounds suitable as activating compounds are the same as listed above for step i).

The value of w is preferably 0, the activating compound being for example a titanium tetraalkoxide containing 4-32 carbon atoms in total from four alkoxy groups. The four alkoxide groups in the compound may be the same or may differ independently. Preferably, at least one of the alkoxy groups in the compound is an ethoxy group. More preferably, the compound is a tetraalkoxide, such as titanium tetraethoxide.

In the preferred process to prepare the procatalyst, one activating compound can be used, but also a mixture of two or more compounds may be used.

A combination of a compound of $M^1(OR^2)_{v-w}(OR^3)_w$ or $M^2(OR^2)_{v-w}(R^3)_w$ with an electron donor is preferred as activating compound to obtain a catalyst system that for example shows high activity, and of which the ethylene sensitivity can be affected by selecting the internal donor; which is specifically advantageous in preparing copolymers of for example propylene and ethylene.

Preferably, a Ti-based compound, for example titanium tetraethoxide, is used together with an alcohol, like ethanol or hexanol, or with an ester compound, like ethylacetate, ethylbenzoate or a phthalate ester, or together with an ether, like dibutylether, or with pyridine.

If two or more activating compounds are used in step ii) their order of addition is not critical, but may affect catalyst performance depending on the compounds used. A skilled person may optimize their order of addition based on some experiments. The compounds of step ii) can be added together or sequentially.

Preferably, an electron donor compound is first added to the compound with formula $Mg(OR^1)_x X^1_{2-x}$ where after a compound of formula $M^1(OR^2)_{v-w}(OR^3)_w$ or $M^2(OR^2)_{v-w}(R^3)_w$ as defined herein is added. The activating compounds preferably are added slowly, for instance during a period of 0.1-6, preferably during 0.5-4 hours, most preferably during 1-2.5 hours, each.

The first intermediate reaction product that is obtained in step i) can be contacted—when more than one activating compound is used—in any sequence with the activating compounds. In one embodiment, an activating electron donor is first added to the first intermediate reaction product and then the compound $M^1(OR^2)_{v-w}(OR^3)_w$ or $M^2(OR^2)_{v-w}(R^3)_w$ is added; in this order no agglomeration of solid particles is observed. The compounds in step ii) are preferably added slowly, for instance during a period of 0.1-6, preferably during 0.5-4 hours, most preferably during 1-2.5 hours, each.

The molar ratio of the activating compound to $Mg(OR^1)_x X^1_{2-x}$ may range between wide limits and is, for instance, from 0.02 to 1.0. Preferably, the molar ratio is from 0.05 to 0.5, more preferably from 0.06 to 0.4, or even from 0.07 to 0.2.

The temperature in step ii) can be in the range from −20° C. to 70° C., preferably from −10° C. to 50° C., more preferably in the range from −5° C. to 40° C., and most preferably in the range from 0° C. to 30° C.

Preferably, at least one of the reaction components is dosed in time, for instance during 0.1 to 6, preferably during 0.5 to 4 hours, more particularly during 1-2.5 hours.

The reaction time after the activating compounds have been added is preferably from 0 to 3 hours.

The mixing speed during the reaction depends on the type of reactor used and the scale of the reactor used. The mixing speed can be determined by a person skilled in the art and should be sufficient to agitate the reactants.

The inert dispersant used in step ii) is preferably a hydrocarbon solvent. The dispersant may be for example an aliphatic or aromatic hydrocarbon with 1-20 carbon atoms. Preferably, the dispersant is an aliphatic hydrocarbon, more preferably pentane, iso-pentane, hexane or heptane, heptane being most preferred.

Starting from a solid Mg-containing product of controlled morphology obtained in step i), said morphology is not negatively affected during treatment with the activating compound during step ii). The solid second intermediate reaction product obtained in step ii) is considered to be an adduct of the Mg-containing compound and the at least one activating compound as defined in step ii), and is still of controlled morphology.

The obtained second intermediate reaction product after step ii) may be a solid and may be further washed, preferably with the solvent also used as inert dispersant; and then stored and further used as a suspension in said inert solvent. Alternatively, the product may be dried, preferably partly dried, preferably slowly and under mild conditions; e.g. at ambient temperature and pressure.

Phase C: Contacting Said Solid Support with the Catalytic Species and Either an Internal Donor and/or an Activator This step can take different forms, such as i) contacting said solid support with a catalytic species and one or more internal donors to obtain an intermediate product; Ii) contacting said solid support with a catalytic species and an activator donor to obtain an intermediate product. Said intermediate product is subsequently used in Phase D, discussed below.

The contacting of the solid support with the catalytic species may comprise several stages (e.g. I, II and/or III). During each of these consecutive stages the solid support is contacted with said catalytic species. In other words, the addition or reaction of said catalytic species may be repeated one or more times. The same or different catalytic species may be used during these stages.

These stages may be divided over Phase C (e.g. step iii) and Phase D (e.g. step v) or step v-a) and v-b). It is possible that Phase C comprises one or more stages and that Phase D comprises also one or more stages.

For example, during stage I in phase C (step iii) the solid support (first intermediate) or the activated solid support (second intermediate) is first contacted with said catalytic species and optionally subsequently with one or more internal donors.

When a second stage is present, during stage II (either Phase C or Phase D) the intermediate product obtained from stage I will be contacted with additional catalytic species which may the same or different than the catalytic species added during the first stage and optionally one or more internal donors and optionally an activator.

For example, during stage I of phase C the solid support (first intermediate) or the activated solid support (second intermediate) is first contacted with said catalytic species and optionally subsequently with one or more internal donors. When a second stage is present, during stage II the intermediate product obtained from stage I will be contacted with additional catalytic species which may the same or different than the catalytic species added during the first stage and optionally one or more internal donors.

In case three stages are present, stage III is preferably a repetition of stage II or may comprise the contacting of the product obtained from phase II with both a catalytic species (which may be the same or different as above) and one or more internal donors. In other words, an internal donor may be added during each of these stages or during two or more of these stages. When an internal donor is added during more than one stage it may be the same or a different internal donor.

An activator may be added either during stage I or stage II or stage III. An activator may also be added during more than one stage.

Preferably, the process of contacting said solid support with the catalytic species and an internal donor comprises the following step iii).

Step iii) Reacting the Solid Support with a Transition Metal Halide

Step iii) reacting the solid support with a transition metal halide (e.g. a halide of titanium, chromium, hafnium, zirconium or vanadium) but preferably titanium halide. In the discussion below only the process for a titanium-base Ziegler-Natta procatalyst is disclosed, however, the application is also applicable to other types of Ziegler-Natta procatalysts.

Step iii): contacting the first or second intermediate reaction product, obtained respectively in step i) or ii), with a halogen-containing Ti-compound and optionally an internal electron donor or activator to obtain a third intermediate product.

Step iii) can be carried out after step i) on the first intermediate product or after step ii) on the second intermediate product.

The molar ratio in step iii) of the transition metal to the magnesium preferably is from 10 to 100, most preferably, from 10 to 50.

Preferably, an internal electron donor is also present during step iii). Also mixtures of internal electron donors can be used. Examples of internal electron donors are disclosed below.

The molar ratio of the internal electron donor relative to the magnesium may vary between wide limits, for instance from 0.02 to 0.75. Preferably, this molar ratio is from 0.05 to 0.4; more preferably from 0.1 to 0.4; and most preferably from 0.1 to 0.3.

During contacting the first or second intermediate product and the halogen-containing titanium compound, an inert dispersant is preferably used. The dispersant preferably is chosen such that virtually all side products formed are dissolved in the dispersant. Suitable dispersants include for example aliphatic and aromatic hydrocarbons and halogenated aromatic solvents with for instance 4-20 carbon atoms. Examples include toluene, xylene, benzene, heptane, o-chlorotoluene and chlorobenzene.

The reaction temperature during step iii) is preferably from 0° C. to 150° C., more preferably from 50° C. to 150° C., and more preferably from 100° C. to 140° C. Most preferably, the reaction temperature is from 110° C. to 125° C.

The reaction time during step iii) is preferably from 10 minutes to 10 hours. In case several stages are present, each stage can have a reaction time from 10 minutes to 10 hours. The reaction time can be determined by a person skilled in the art based on the type and the scale of the reactor and the procatalyst.

The mixing speed during the reaction depends on the type of reactor used and the scale of the reactor used. The mixing speed can be determined by a person skilled in the art and should be sufficient to agitate the reactants.

The obtained reaction product may be washed, usually with an inert aliphatic or aromatic hydrocarbon or halogenated aromatic compound, to obtain the procatalyst of the invention. If desired the reaction and subsequent purification steps may be repeated one or more times. A final washing is preferably performed with an aliphatic hydrocarbon to result in a suspended or at least partly dried procatalyst, as described above for the other steps.

Optionally an activator is present during step iii) of Phase C instead of an internal donor, this is explained in more detail below in the section of activators.

The molar ratio of the activator relative to the magnesium may vary between wide limits, for instance from 0.02 to 0.5.

Preferably, this molar ratio is from 0.05 to 0.4; more preferably from 0.1 to 0.3; and most preferably from 0.1 to 0.2.

Phase D: Modifying Said Catalyst with a Metal-Based Modifier

This phase D is the key to the present invention. In a preferred process for modifying the supported catalyst, this phase comprises of the following step:

Step iv) modifying the third intermediate reaction product with a metal-modifier to yield a modified intermediate reaction product.

After step iv) an additional step of contacting the intermediate product with a catalytic species (in other words, an additional stage):

Step v) contacting said modified intermediate product with a titanium halide and optionally on or more internal donors and/or activators to obtain the present procatalyst.

The order of addition, viz. the order of first step iv) and subsequently step v) is considered to be very important to the formation of the correct clusters of Group 13- or transition metal and titanium forming the modified and more active catalytic center.

Each of these steps is disclosed in more detail below.

It should be noted that the steps iii), iv) and v) (viz. phases C and D) are preferably carried out in the same reactor, viz. in the same reaction mixture, directly following each other.

Preferably step iv) is carried out directly after step iii) in the same reactor. Preferably, step v) is carried out directly after step iv) in the same reactor.

Thus summarizing it can be said that in a first specific embodiment the present method comprises the following treatment steps: 1) titanium treatment using di-isobutyl phthalate as internal donor [step iii)], 2) Aluminum treatment [step iv], 3) titanium treatment [step v]; 4) titanium treatment [step v repeated].

Thus summarizing it can be said that in a second specific embodiment the present method comprises the following treatment steps: 1) titanium treatment using ethylbenzoate as activator [step iii)], 2) aluminum treatment [step iv], 3) titanium treatment using 4-[benzoyl(methyl)amino]pentan-2-yl benzoate as internal donor [step v]; 4) titanium treatment [step v repeated].

Thus, preferably there are three treatments with titanium and one treatment with a modifier.

Step iv): Group 13- or Transition Metal Modification

This step is the key in the present invention.

The modification with a Group 13- or transition metal, preferably aluminum, ensures the presence of a Group 13- or transition metal in the procatalyst, in addition to magnesium (from the solid support) and titanium (from the titanation treatment).

Without wishing to be bound by any particular theory, the present invention believe that one possible explanation is that the presence of the Group 13- or transition metal increases the reactivity of the active site and hence increases the yield of polymer.

Step iv) comprises modifying the third intermediate product obtained in step iii) with a modifier having the formula $M(p)X_p$, preferably $MX_3$, wherein M is a metal selected from the Group 13 metals and transition metals of the IUPAC periodic table of elements, p is the oxidation state of M, and wherein X is a halide to yield a modified intermediate product. In case the oxidation state of M, e.g. aluminum, is three, M(p) is Al(III) and there are three monovalent halides X, e.g. $AlCl_3$ or $AlF_3$. In case the oxidation state of M, e.g. copper, is two, M(p) is Cu(II) and there are two monovalent halides X, $CuBr_2$ or $CuCl_2$.

Step iv) is preferably carried out directly after step iii), more preferably in the same reactor and preferably in the same reaction mixture. In an embodiment, a mixture of aluminum trichloride and a solvent, e.g. chlorobenzene, is added to the reactor after step iii) has been carried out. After the reaction has completed a solid is allowed to settle which can either be obtained by decanting or filtration and optionally purified or a suspension of which in the solvent can be used for the following step, viz. step v).

The metal modifier is preferably selected from the group of aluminum modifiers (e.g. aluminum halides), boron modifiers (e.g. boron halides), gallium modifiers (e.g. gallium halides), zinc modifiers (e.g. zinc halides), copper modifiers (e.g. copper halides), thallium modifiers (e.g. thallium halides), indium modifiers (e.g. indium halides), vanadium modifiers (e.g. vanadium halides), chromium modifiers (e.g. chromium halides) and iron modifiers (e.g. iron halides).

Examples of suitable modifiers are aluminum trichloride, aluminum tribromide, aluminum triiodide, aluminum trifluoride, boron trichloride, boron tribromide boron triiodide, boron trifluoride, gallium trichloride, gallium tribromide, gallium triiodide, gallium trifluoride, zinc dichloride, zinc dibromide, zinc diiodide, zinc difluoride, copper dichloride, copper dibromide, copper diiodide, copper difluoride, copper chloride, copper bromide, copper iodide, copper fluoride, thallium trichloride, thallium tribromide, thallium triiodide, thallium trifluoride, thallium chloride, thallium bromide, thallium iodide, thallium fluoride, Indium trichloride, indium tribromide, indium triiodide, indium trifluoride, vanadium trichloride, vanadium tribromide, vanadium triiodide, vanadium trifluoride, chromium trichloride, chromium dichloride, chromium tribromide, chromium dibromide, iron dichloride, iron trichloride, iron tribromide, iron dichloride, iron triiodide, iron diiodide, iron trifluoride and iron difluoride.

The amount of metal halide added during step iv) may vary according to the desired amount of metal present in the procatalyst. It may for example range from 0.1 to 5 wt. % based on the total weight of the support, preferably from 0.5 to 1.5 wt. %.

The metal halide is preferably mixed with a solvent prior to the addition to the reaction mixture. The solvent for this step may be selected from for example aliphatic and aromatic hydrocarbons and halogenated aromatic solvents with for instance 4-20 carbon atoms. Examples include toluene, xylene, benzene, decane, o-chlorotoluene and chlorobenzene. The solvent may also be a mixture or two or more thereof.

The duration of the modification step may vary from 1 minute to 120 minutes, preferably from 40 to 80 minutes, more preferably from 50 to 70 minutes. This time is dependent on the concentration of the modifier, the temperature, the type of solvent used etc.

The modification step is preferably carried out at elevated temperatures (e.g. from 50 to 120° C., preferably from 90 to 110° C.).

The modification step may be carried out while stirring. The mixing speed during the reaction depends i.a. on the type of reactor used and the scale of the reactor used. The mixing speed can be determined by a person skilled in the art. As a non-limiting example, mixing may be carried at a stirring speed from 100 to 400 rpm, preferably from 150 to 300 rpm, more preferably about 200 rpm.

The wt/vol ratio for the metal halide and the solvent in step iv) is from 0.01 gram-0.1 gram:5.0-100 ml.

The modified intermediate product is present in a solvent. It can be kept in that solvent after which the following step v) is directly carried out. However, it may be isolated and/or purified. The solid can be allowed to settle by stopping the stirring. The supernatant can than be removed by decanting. Otherwise, filtration of the suspension is also possible. The solid product may be washed once or several times with the same solvent used during the reaction or another solvent selected from the same group described above. The solid may be resuspended or may be dried or partially dried for storage.

Subsequent to this step, step v) is carried out to produce the procatalyst according to the present invention.

Step v): Titanation of Intermediate Product

This step is very similar to step iii). It relates to the additional titanation of the modified intermediate product. It is an additional stage of contacting with catalytic species (viz. titanation in this embodiment).

Step v) contacting said modified intermediate product obtained in step iv) with a halogen-containing titanium compound to obtain the procatalyst according to the present invention. When an activator is used during step iii) an internal donor is used during this step.

Step v) is preferably carried out directly after step iv), more preferably in the same reactor and preferably in the same reaction mixture.

In an embodiment, at the end of step iv) or at the beginning of step v) the supernatant is removed from the solid modified intermediate product obtained in step iv) by filtration or by decanting. To the remaining solid, a mixture of titanium halide (e.g. tetrachloride) and a solvent (e.g. chlorobenzene) may be added. The reaction mixture is subsequently kept at an elevated temperature (e.g. from 100 to 130° C., such as 115° C.) for a certain period of time (e.g. from 10 to 120 minutes, such as from 20 to 60 minutes, e.g. 30 minutes). After this, a solid substance is allowed to settle by stopping the stirring.

The molar ratio of the transition metal to the magnesium preferably is from 10 to 100, most preferably, from 10 to 50.

Optionally, an internal electron donor is also present during this step. Also mixtures of internal electron donors can be used. Examples of internal electron donors are disclosed below. The molar ratio of the internal electron donor relative to the magnesium may vary between wide limits, for instance from 0.02 to 0.75. Preferably, this molar ratio is from 0.05 to 0.4; more preferably from 0.1 to 0.4; and most preferably from 0.1 to 0.3.

The solvent for this step may be selected from for example aliphatic and aromatic hydrocarbons and halogenated aromatic solvents with for instance 4-20 carbon atoms. The solvent may also be a mixture or two or more thereof.

According to a preferred embodiment of the present invention this step v) is repeated, in other words, the supernatant is removed as described above and a mixture of titanium halide (e.g. tetrachloride) and a solvent (e.g. chlorobenzene) is added. The reaction is continued at elevated temperatures during a certain time which can be same or different from the first time step v) is carried out.

The step may be carried out while stirring. The mixing speed during the reaction depends on the type of reactor used and the scale of the reactor used. The mixing speed can be determined by a person skilled in the art. This can be the same as discussed above for step iii).

Thus, step v) can be considered to consist of at least two sub steps in this embodiment, being:

v-a) contacting said modified intermediate product obtained in step iv) with titanium tetrachloride—optionally using an internal donor—to obtain a partially titanated procatalyst; (this can e.g. be considered to be stage II as discussed above for a three-stage Phase C)

v-b) contacting said partially titanated procatalyst obtained in step v-a) with titanium tetrachloride to obtain the procatalyst. (this can e.g. be considered to be stage III as discussed above for a three-stage Phase C)

Additional sub steps can be present to increase the number of titanation steps to four or higher (e.g. stages IV, V etc.)

The solid substance (procatalyst) obtained is washed several times with a solvent (e.g. heptane), preferably at elevated temperature, e.g. from 40 to 100° C. depending on the boiling point of the solvent used, preferably from 50 to 70° C. After this, the procatalyst, suspended in solvent, is obtained. The solvent can be removed by filtration or decantation. The procatalyst can be used as such wetted by the solvent or suspended in solvent or it can be first dried, preferably partly dried, for storage. Drying can e.g. be carried out by low pressure nitrogen flow for several hours.

Thus in this embodiment, the total titanation treatment comprises three phases of addition of titanium halide. Wherein the first phase of addition is separated from the second and third phases of addition by the modification with metal halide.

The titanation step (viz. the step of contacting with a titanium halide) according to the present invention is split into two parts and a Group 13- or transition metal modification step is introduced between the two parts or stages of the titanation. Preferably, the first part of the titanation comprises one single titanation step (Stage I) and the second part of the titanation comprises two subsequent titanation steps (Stages II and III). But different procedures may also be used. When this modification is carried out before the titanation step the increase in activity was higher as observed by the inventors. When this modification is carried out after the titanation step the increase in activity was less as observed by the present inventors.

An embodiment of the present invention comprises the following steps: i) preparation of first intermediate reaction product; ii) activation of solid support to yield second intermediate reaction product; iii) first titanation or Stage I to yield third intermediate reaction product; iv) modification to yield modified intermediate product; v) at least one second titanation step to yield the procatalyst.

In a preferred embodiment, the procatalyst comprises an aminobenzoate compound represented by formula XI as internal donor and ethyl benzoate as activator and is prepared using butyl Grignard, preferably n-BuMgCl, as the Grignard compound in step i).

In this specific embodiment, the present invention relates in more detail to a process for preparing a polymerization procatalyst comprising the steps of:
  i) contacting butyl magnesium chloride with tetraethoxysilane to give a first intermediate reaction product;
  ii) contacting the first intermediate reaction product obtained in step i) with ethyl alcohol and tetraethoxy titanium as activating compounds in the presence of an inert dispersant to give a second intermediate reaction product;
  iii) contacting the second intermediate reaction product obtained in step ii) with titanium tetrachloride and ethyl benzoate as an activator to obtain a third intermediate reaction product;
  iv) modifying the third intermediate reaction product obtained in step iii) with a modifier having the formula $AlCl_3$ to yield a modified intermediate reaction product;

v-a) contacting said modified intermediate reaction product obtained in step iv) with titanium tetrachloride and 4-[benzoyl(methyl)amino]pentan-2-yl benzoate as internal donor to obtain a partially titanated procatalyst;

v-b) contacting said partially titanated procatalyst obtained in step v-a) with titanium tetrachloride to obtain the procatalyst;

wherein butyl magnesium chloride used in step i), titanium tetrachloride used in step iii) and step v) and aluminum trichloride used in step iv) are used in such amounts that the resulting the procatalyst comprises in wt. % based on the total weight of the procatalyst: Magnesium: from 15 to 24, preferably from 19.0 to 19.5; Titanium: from 1 to 4, preferably from 1.5 to 3.5; Aluminum: from 0.05 to 2.0, preferably from 0.1 to 0.4.

In a preferred embodiment, the procatalyst comprises an aminobenzoate compound represented by formula XI as internal donor and ethyl benzoate as activator and is prepared using phenyl Grignard, preferably PhMgCl, as the Grignard compound in step i).

In a specific embodiment, the present invention relates to a process for preparing a polymerization procatalyst comprising the steps of:

i) contacting phenyl magnesium chloride with tetraethoxysilane to give a first intermediate reaction product;

ii) contacting the first intermediate reaction product obtained in step i) with ethyl alcohol and tetraethoxytitanium as activating compounds in the presence of an inert dispersant to give a second intermediate reaction product;

iii) contacting the second intermediate reaction product obtained in step ii) with titanium tetrachloride and di-isobutyl phthalate as an internal electron donor to obtain a third intermediate reaction product;

iv) modifying the third intermediate reaction product obtained in step iii) with a modifier having the formula AlCl$_3$ to yield a modified intermediate reaction product;

v-a) contacting said modified intermediate reaction product obtained in step iv) with titanium tetrachloride to obtain a partially titanated procatalyst;

v-b) contacting said partially titanated procatalyst obtained in step v-a) with titanium tetrachloride to obtain the procatalyst;

wherein phenyl magnesium chloride used in step i), titanium tetrachloride used in step iii) and step v) and aluminum trichloride used in step iv) are used in such amounts that the resulting the procatalyst comprises in wt. % based on the total weight of the procatalyst: Magnesium: from 15 to 24, preferably from 19.0 to 19.5; Titanium: from 1 to 4, preferably from 1.5 to 3.5; Aluminum: from 0.05 to 2.0, preferably from 0.1 to 0.4.

In a preferred embodiment, the procatalyst comprises 9,9-bis (methoxymethyl) fluorine as internal donor and a benzamide compound according to formula X as activating electron donor used in step ii) and the procatalyst is prepared using butyl Grignard, preferably n-BuMgCl, as the Grignard compound in step i).

In a preferred embodiment, the procatalyst comprises 9,9-bis(methoxymethyl) fluorine as internal donor and a benzamide compound according to formula X as activating electron donor used in step ii) and the procatalyst is prepared using phenyl Grignard, preferably PhMgCl, as the Grignard compound in step i).

In another specific embodiment, the present invention relates to a process for preparing a polymerization procatalyst comprising the steps of:

i) contacting phenyl magnesium chloride with tetraethoxysilane to give a first intermediate reaction product;

ii) contacting the first intermediate reaction product obtained in step i) with ethyl alcohol and tetraethoxy titanium as activating compounds in the presence of an inert dispersant to give a second intermediate reaction product;

iii) contacting the second intermediate reaction product obtained in step ii) with titanium tetrachloride and ethyl benzoate as an activator to obtain a third intermediate reaction product;

iv) modifying the third intermediate reaction product obtained in step iii) with a modifier having the formula AlCl$_3$ to yield a modified intermediate reaction product;

v-a) contacting said modified intermediate reaction product obtained in step iv) with titanium tetrachloride and 4-[benzoyl(methyl)amino]pentan-2-yl benzoate as internal donor to obtain a partially titanated procatalyst;

v-b) contacting said partially titanated procatalyst obtained in step v-a) with titanium tetrachloride to obtain the procatalyst;

wherein phenyl magnesium chloride used in step i), titanium tetrachloride used in step iii) and step v) and aluminum trichloride used in step iv) are used in such amounts that the resulting the procatalyst comprises in wt. % based on the total weight of the procatalyst: Magnesium: from 15 to 24, preferably from 19.0 to 19.5; Titanium: from 1 to 4, preferably from 1.5 to 3.5; Aluminum: from 0.05 to 2.0, preferably from 0.1 to 0.4.

During the steps o) to v) shown above the following ratios of reaction products have been used.

The procatalyst may have a titanium, hafnium, zirconium, chromium or vanadium (preferably titanium) content of from about 0.1 wt. % to about 6.0 wt. %, based on the total solids weight, or from about 1.0 wt. % to about 4.5 wt. %, or from about 1.5 wt. % to about 3.5 wt. %.

The weight ratio of titanium, hafnium, zirconium, chromium or vanadium (preferably titanium) to magnesium in the solid procatalyst may be from about 1:3 to about 1:60, or from about 1:4 to about 1:50, or from about 1:6 to about 1:30. Weight percentage is based on the total weight of the procatalyst.

The transition metal-containing solid catalyst compound according to the present invention comprises a transition metal halide (e.g. titanium halide, chromium halide, hafnium halide, zirconium halide, vanadium halide) supported on a metal or metalloid compound (e.g. a magnesium compound or a silica compound).

Preferably, a magnesium-based or magnesium-containing support is used in the present invention. Such a support is prepared from magnesium-containing support-precursors, such as magnesium halides, magnesium alkyls and magnesium aryls, and also magnesium alkoxy and magnesium aryloxy compounds.

The support may be activated using activation compounds as described in more detail above under Phase B.

The catalyst may further be activated during Phase C as discussed above for the process. This activation increases the yield of the resulting catalyst composition in olefin polymerization.

Several activators can be used, such as benzamide, alkylbenzoates, and monoesters. Each of these will be discussed below.

In an embodiment, an activator is present during this step iii). Preferably, no internal donor is added during this step when an activator is used.

The activator is preferably an alkylbenzoate, more preferably ethylbenzoate. The activator may also be a monoester. When an activator is present during this step, an internal donor is added during step v) described below.

In an embodiment of the present invention no monoester is present.

Alkylbenzoates may be used as activators. The activator may hence be selected from the group alkylbenzoates having an alkylgroup having from 1 to 10, preferably from 1 to 6 carbon atoms. Examples of suitable alkyl benzoates are methylbenzoate, ethylbenzoate according to Formula II, n-propylbenzoate, iso-propylbenzoate, n-butylbenzoate, 2-butylbenzoate, t-butylbenzoate.

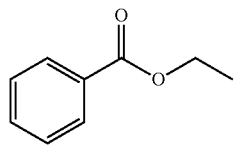

Formula II

More preferably, the activator is ethylbenzoate. In a even more preferred embodiment, ethylbenzoate as activator is added during step iii) and a benzamide internal donor is added during step v), most preferably 4-[benzoyl(methyl)amino]pentan-2-yl benzoate according to Formula XII (above).

Mono-esters may be used as activators. The monoester according to the present invention can be any ester of a monocarboxylic acid known in the art. The structures according to Formula V are also mono-esters but are not explained in this section, see the section on Formula V. The monoester can have the formula XXIII $R^{94}$—CO—$OR^{95}$ Formula XXIII $R^{94}$ and $R^{95}$ are each independently selected from a hydrogen or a hydrocarbyl group selected from alkyl, alkenyl, aryl, aralkyl, alkoxycarbonyl or alkylaryl groups, and one or more combinations thereof. Said hydrocarbyl group may be linear, branched or cyclic. Said hydrocarbyl group may be substituted or unsubstituted. Said hydrocarbyl group may contain one or more heteroatoms. Preferably, said hydrocarbyl group has from 1 to 10 carbon atoms, more preferably from 1 to 8 carbon atoms, even more preferably from 1 to 6 carbon atoms. When $R^{94}$ is an aryl, this structure is similar to Formula V. Examples of aromatic mono-esters are discussed with reference to formula V.

Preferably said mono-ester is an aliphatic monoester. Suitable examples of mono-esters include formates, for instance, butyl formate; acetates, for instance ethyl acetate, amyl acetate and butyl acetate; acrylates, for instance ethyl acrylate, methyl methacrylate and isobutyl methacrylate. More preferably, the aliphatic monoester is an acetate. Most preferably, the aliphatic monoester is ethyl acetate.

In an embodiment, the monoester used in step iii) is an ester of an aliphatic monocarboxylic acid having from 1 to 10 carbon atoms. Wherein $R^{94}$ is an aliphatic hydrocarbyl group.

The molar ratio between the monoester in step iii) and Mg may range from 0.05 to 0.5, preferably from 0.1 to 0.4, and most preferably from 0.15 to 0.25.

The monoester is not used as a stereospecificity agent, like usual internal donors are known to be in the prior art. The monoester is used as an activator.

Without wishing to be bound by any theory, the inventors believe that the monoester used in the process according to the present invention participates in the formation of the magnesium halogen (e.g. $MgCl_2$) crystallites during the interaction of Mg-containing support with titanium halogen (e.g. $TiCl_4$). The monoester may form intermediate complexes with Ti and Mg halogen compounds (for instance, $TiCl_4$, $TiCl_3(OR)$, $MgCl_2$, $MgCl(OEt)$, etc.), which help the removal of titanium products from solid particles to mother liquor and affect the activity of final catalyst. Therefore, the monoester according to the present invention can also be referred to as an activator.

As used herein, an "internal electron donor" or an "internal donor" is a compound added during formation of the procatalyst that donates a pair of electrons to one or more metals present in the resultant procatalyst. Not bounded by any particular theory, it is believed that the internal electron donor assists in regulating the formation of active sites thereby enhancing catalyst stereoselectivity.

The internal electron donor can be any compound known in the art to be used as internal electron donor. Suitable examples of internal donors include aromatic acid esters, such as monocarboxylic acid ester or dicarboxylic acid esters (e.g. ortho-dicarboxylic acid esters such as phthalic acid esters), (N-alkyl)amidobenzoates, 1,3-diethers, silyl esters, fluorenes, succinates and/or combinations thereof.

Preferably the internal donor used during step iii) or step v) is selected from the group consisting of dicarboxylic acid esters (phthalates) according to Formula VI and aminobenzoates according to Formula XI.

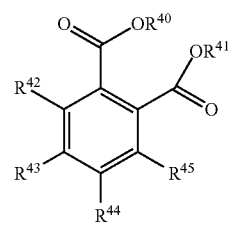

Formula VI $R^{40}$ and $R^{41}$ are each independently a hydrocarbyl group selected from alkyl, alkenyl, aryl, aralkyl, alkoxycarbonyl or alkylaryl groups, and one or more combinations thereof. Said hydrocarbyl group may be linear, branched or cyclic. Said hydrocarbyl group may be substituted or unsubstituted. Said hydrocarbyl group may contain one or more heteroatoms. Preferably, said hydrocarbyl group has from 1 to 10 carbon atoms, more preferably from 1 to 8 carbon atoms, even more preferably from 1 to 6 carbon atoms. Suitable examples of hydrocarbyl groups include alkyl-, cycloalkyl-, alkenyl-, alkadienyl-, cycloalkenyl-, cycloalkadienyl-, aryl-, aralkyl, alkylaryl, and alkynyl-groups.

$R^{42}$, $R^{43}$, $R^{44}$, $R^{45}$ are each independently selected from hydrogen, a halide or a hydrocarbyl group, e.g. selected from alkyl, alkenyl, aryl, aralkyl, alkoxycarbonyl or alkylaryl groups, and one or more combinations thereof. Said hydrocarbyl group may be linear, branched or cyclic. Said hydrocarbyl group may be substituted or unsubstituted. Said hydrocarbyl group may contain one or more heteroatoms. Preferably, said hydrocarbyl group has from 1 to 10 carbon atoms, more preferably from 1 to 8 carbon atoms, even more preferably from 1 to 6 carbon atoms.

Suitable non-limiting examples of phthalic acid esters include dimethyl phthalate, diethyl phthalate, di-n-propyl phthalate, diisopropyl phthalate, di-n-butyl phthalate, diisobutyl phthalate, di-t-butyl phthalate, diisoamyl phthalate, di-tert-amyl phthalate, dineopentyl phthalate, di-2-ethylhexyl phthalate, di-2-ethyldecyl phthalate, bis(2,2,2-trifluoroethyl) phthalate, diisobutyl 4-t-butylphthalate, and diisobutyl 4-chlorophthalate. The phthalic acid ester is preferably di-n-butyl phthalate or di-isobutyl phthalate.

When an aminobenzoate (AB) according to Formula XI is used as an internal donor this ensures a better control of stereochemistry and allows preparation of polyolefins having a broader molecular weight distribution.

Aminobenzoates suitable as internal donor according to the present invention are the compounds represented by Formula (XI):

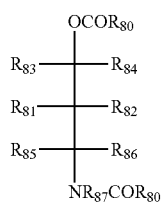

Formula XI wherein:

$R^{80}$ is a aromatic group, selected from aryl or alkylaryl groups and may be substituted or unsubstituted. Said aromatic group may contain one or more heteroatoms. Preferably, said aromatic group has from 6 to 20 carbon atoms. It should be noted that the two $R^{80}$ groups may be the same but may also be different.

$R^{80}$ can be the same or different than any of $R^{81}$-$R^{87}$ and is preferably an aromatic substituted and unsubstituted hydrocarbyl having 6 to 10 carbon atoms.

More preferably, $R^{80}$ is selected from the group consisting of $C_6$-$C_{10}$ aryl unsubstituted or substituted with e.g. an acylhalide or an alkoxyde; and $C_7$-$C_{10}$ alkaryl and aralkyl group; for instance, 4-methoxyphenyl, 4-chlorophenyl, 4-methylphenyl.

Particularly preferred, $R^{80}$ is substituted or unsubstituted phenyl, benzyl, naphthyl, ortho-tolyl, para-tolyl oranisol group. Most preferably, $R^{80}$ is phenyl.

$R^{81}$, $R^{82}$, $R^{83}$, $R^{84}$, $R^{85}$, and $R^{86}$ are each independently selected from hydrogen or a hydrocarbyl group, e.g. selected from alkyl, alkenyl, aryl, aralkyl, alkoxycarbonyl or alkylaryl groups, and one or more combinations thereof. Said hydrocarbyl group may be linear, branched or cyclic. Said hydrocarbyl group may be substituted or unsubstituted. Said hydrocarbyl group may contain one or more heteroatoms. Preferably, said hydrocarbyl group has from 1 to 20 carbon atoms.

More preferably, $R^{81}$, $R^{82}$, $R^{83}$, $R^{84}$, $R^{85}$, and $R^{86}$ are independently selected from a group consisting of hydrogen, $C_1$-$C_{10}$ straight and branched alkyl; $C_3$-$C_{10}$ cycloalkyl; $C_6$-$C_{10}$ aryl; and $C_7$-$C_{10}$ alkaryl and aralkyl group.

Even more preferably, $R^{81}$, $R^{82}$, $R^{83}$, $R^{84}$, $R^{85}$, and $R^{86}$ are independently selected from a group consisting of hydrogen, methyl, ethyl, propyl, isopropyl, butyl, t-butyl, phenyl, trifluoromethyl and halophenyl group.

Most preferably, $R^{81}$, $R^{82}$, $R^{83}$, $R^{84}$, $R^{85}$, and $R^{86}$ are each hydrogen, methyl, ethyl, propyl, t-butyl, phenyl or trifluoromethyl.

Preferably, $R^{81}$ and $R^{82}$ is each a hydrogen atom.

More preferably, $R^{81}$ and $R^{82}$ is each a hydrogen atom and each of $R^{83}$, $R^{84}$, $R^{85}$, and $R^{86}$ is selected from the group consisting of hydrogen, $C_1$-$C_{10}$ straight and branched alkyls; $C_3$-$C_{10}$ cycloalkyls; $C_6$-$C_{10}$ aryls; and $C_7$-$C_{10}$ alkaryl and aralkyl group.

Preferably, at least one of $R^{83}$ and $R^{84}$ and at least one of $R^{85}$ and $R^{86}$ is a hydrocarbyl group having at least one carbon atom, being selected from the group as defined above.

More preferably, when at least one of $R^{83}$ and $R^{84}$ and one of $R^{85}$ and $R^{86}$ is a hydrocarbyl group having at least one carbon atom then the other one of $R_3$ and $R_4$ and of $R^{85}$ and $R^{86}$ is each a hydrogen atom.

Most preferably, when one of $R^{83}$ and $R^{84}$ and one of $R^{85}$ and $R^{86}$ is a hydrocarbyl group having at least one carbon atom, then the other one of $R^{83}$ and $R^{84}$ and of $R^{85}$ and $R^{86}$ is each a hydrogen atom and $R^{81}$ and $R^{82}$ is each a hydrogen atom.

Preferably, $R^{81}$ and $R^{82}$ is each a hydrogen atom and one of $R^{83}$ and $R^{84}$ and one of $R^{85}$ and $R^{86}$ is selected from the group consisting of $C_1$-$C_{10}$ straight and branched alkyl; $C_3$-$C_{10}$ cycloalkyl; $C_6$-$C_{10}$ aryl; and $C_7$-$C_{10}$ alkaryl and aralkyl group;

More preferably $R^{85}$ and $R^{86}$ is selected from the group consisting of $C_1$-$C_{10}$ alkyl, such as methyl, ethyl, propyl, isopropyl, butyl, t-butyl, phenyl, trifluoromethyl and halophenyl group; and most preferably, one of $R^{83}$ and $R^{84}$, and one of $R^{85}$ and $R^{86}$ is methyl.

$R^{87}$ is a hydrocarbyl group, e.g. selected from alkyl, alkenyl, aryl, aralkyl, alkoxycarbonyl or alkylaryl groups, and one or more combinations thereof. Said hydrocarbyl group may be linear, branched or cyclic. Said hydrocarbyl group may be substituted or unsubstituted. Said hydrocarbyl group may contain one or more heteroatoms. Preferably, said hydrocarbyl group has from 1 to 20 carbon atoms, more preferably from 1 to 10 carbon atoms. $R^{87}$ may be the same or different than any of $R^{81}$, $R^{82}$, $R^{83}$, $R^{84}$, $R^{85}$, and $R^{86}$ with the provision that $R^{87}$ is not a hydrogen atom. $R^{87}$ may also be a hydrogen atom.

More preferably, $R^{87}$ is selected from a group consisting of $C_1$-$C_{10}$ straight and branched alkyl; $C_3$-$C_{10}$ cycloalkyl; $C_6$-$C_{10}$ aryl; and $C_7$-$C_{10}$ alkaryl and aralkyl group.

Even more preferably, $R^{87}$ is selected from a group consisting of methyl, ethyl, propyl, isopropyl, butyl, t-butyl, phenyl, benzyl and substituted benzyl and halophenyl group.

Most preferably, $R^{87}$ is methyl, ethyl, propyl, isopropyl, benzyl or phenyl; and even most preferably, $R^{87}$ is methyl, ethyl or propyl.

Without being limited thereto, particular examples of the compounds of formula (XI) are the structures as depicted in formulas (XII)-(XXII). For instance, the structure in Formula (XII) may correspond to 4-[benzoyl(methyl)amino] pentan-2-yl benzoate; Formula (XIII) to 3-[benzoyl(cyclohexyl)amino]-1-phenylbutyl benzoate; Formula (XIV) to 3-[benzoyl(propan-2-yl)amino]-1-phenylbutyl benzoate; Formula (XV) to 4-[benzoyl(propan-2-yl)amino]pentan-2-yl benzoate; Formula (XVI) to 4-[benzoyl(methyl)amino]-1,1,1-trifluoropentan-2-yl benzoate; Formula (XVII) to 3-(methylamino)-1,3-diphenylpropan-1-oldibenzoate; Formula (XVIII) to 2,2,6,6-tetramethyl-5-(methylamino)heptan-3-ol dibenzoate; Formula (XIX) to 4-[benzoyl (ethyl) amino]pentan-2-yl benzoate; Formula (XX) to 3-(methyl) amino-propan-1-ol dibenzoate; Formula (XXI) to 3-(methyl)amino-2,2-dimethylpropan-1-ol dibenzoate; Formula (XXII) to 4-(methylamino)pentan-2-yl bis (4-methoxy)benzoate).

It has been surprisingly found that the catalyst composition comprising the compound of formula (XI) as an internal electron donor shows better control of stereochemistry and allows preparation of polyolefins, particularly of polypropylenes having broader molecular weight distribution and higher isotacticity.

Preferably, the catalyst composition according to the invention comprises the compound having formula (XI) as the only internal electron donor in a Ziegler-Natta catalyst composition.

The compounds of formula (XII), (XIX), (XXII) and (XVIII) are the most preferred internal electron donors in the catalyst composition according to the present invention as they allow preparation of polyolefins having broader molecular weight distribution and higher isotacticity.

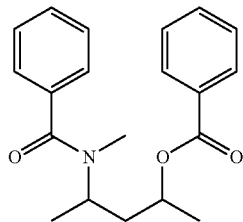

Formula (XII)

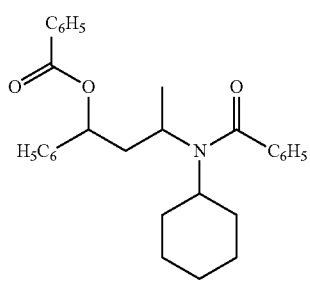

Formula (XIII)

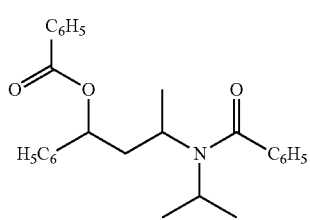

Formula (XIV)

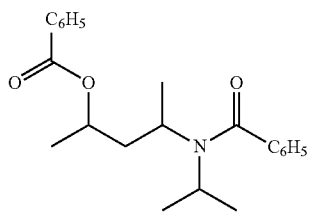

Formula (XV)

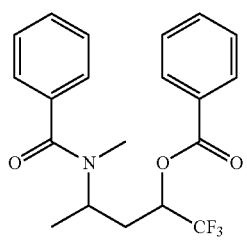

Formula (XVI)

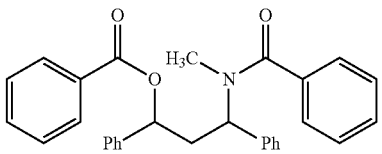

Formula (XVII)

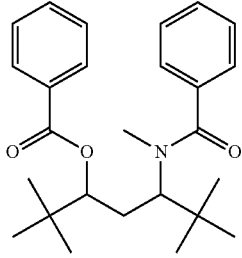

Formula (XVIII)

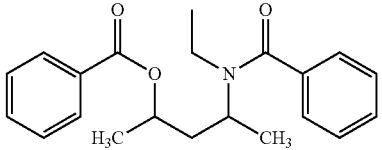

Formula (XIX)

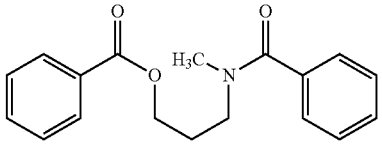

Formula (XX)

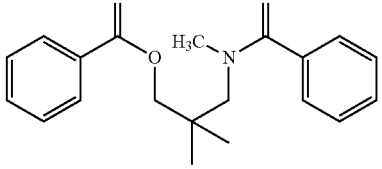

Formula (XXI)

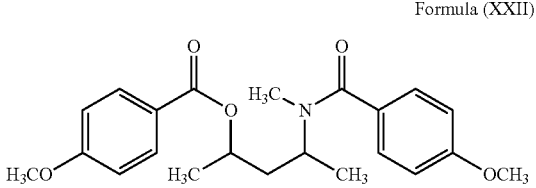

Formula (XXII)

The compound according to formula (XI) can be made by any method known in the art. In this respect, reference is made to J. Chem. Soc. Perkin trans. I 1994, 537-543 and to Org. Synth. 1967, 47, 44. These documents disclose a step a) of contacting a substituted 2,4-diketone with a substituted amine in the presence of a solvent to give a β-enaminoketone; followed by a step b) of contacting the β-enaminoketone with a reducing agent in the presence of a solvent to give a γ-aminoalcohol. The substituted 2,4-diketone and the substituted amine can be applied in step a) in amounts ranging from 0.5 to 2.0 mole, preferably from 1.0 to 1.2 mole. The solvent in steps a) and b) may be added in an amount of 5 to 15 volume, based on the total amount of the diketone, preferably of 3 to 6 volume. The β-enaminoketone to diketone mole ratio in step b) may be of from 0.5 to 6, preferably from 1 to 3. The reducing agent to β-enaminoketone mole ratio in step b) may be of from 3 to 8, preferably from 4 to 6; the reducing agent may be selected from the group comprising metallic sodium, NaBH₄ in acetic acid, Ni—Al alloy. Preferably, the reducing agent is metallic sodium because it is a cheap reagent.

The γ-aminoalcohol that can be used for making compound (XI) can be synthesized as described in the literature and also mentioned herein above or this compound can be directly purchased commercially and used as a starting compound in a reaction to obtain the compound represented by formula (XI). Particularly, the γ-aminoalcohol can be reacted with a substituted or unsubstituted benzoyl chloride in the presence of a base to obtain the compound represented by formula (XI) (referred herein also as step c), regardless that γ-aminoalcohol was synthesized as described in the literature or commercially purchased). The molar ratio between the substituted or unsubstituted benzoyl chloride and the γ-aminoalcohol may range from 2 to 4, preferably from 2 to 3. The base may be any basic chemical compound that is able to deprotonate the γ-aminoalcohol. Said base can have a $pK_a$ of at least 5; or at least 10 or preferably from 5 to 40, wherein $pK_a$ is a constant already known to the skilled person as the negative logarithm of the acid dissociation constant $k_a$. Preferably, the base is pyridine; a trialkyl amine, e.g. triethylamine; or a metal hydroxide e.g. NaOH, KOH. Preferably, the base is pyridine. The molar ratio between the base and the γ-aminoalcohol may range from 3 to 10, preferably from 4 to 6.

The solvent used in any of steps a), b) and c) can be selected from any organic solvents, such as toluene, dichloromethane, 2-propanol, cyclohexane or mixtures of any organic solvents. Preferably, toluene is used in each of steps a), b) and c). More preferably, a mixture of toluene and 2-propanol is used in step b). The solvent in step c) can be added in an amount of 3 to 15 volume, preferably from 5 to 10 volume based on the γ-aminoalcohol.

The reaction mixture in any of steps a), b) and c) may be stirred by using any type of conventional agitators for more than about 1 hour, preferably for more than about 3 hours and most preferably for more than about 10 hours, but less than about 24 hours. The reaction temperature in any of steps a) and b) may be the room temperature, i.e. of from about 15 to about 30° C., preferably of from about 20 to about 25° C. The reaction temperature in step c) may range from 0 to 10° C., preferably from 5 to 10° C. The reaction mixture in any of steps a), b) and c) may be refluxed for more than about 10 hours, preferably for more than about 20 hours but less than about 40 hours or until the reaction is complete (reaction completion may be measured by Gas Chromatography, GC). The reaction mixture of steps a) and b) may be then allowed to cool to room temperature, i.e. at a temperature of from about 15 to about 30° C., preferably of from about 20 to about 25° C. The solvent and any excess of components may be removed in any of steps a), b) and c) by any method known in the art, such as evaporation or washing. The obtained product in any of steps b) and c) can be separated from the reaction mixture by any method known in the art, such as by extraction over metal salts, e.g. sodium sulfate.

The molar ratio of the internal donor of formula (XI) relative to the magnesium can be from 0.02 to 0.5. Preferably, this molar ratio is from 0.05 to 0.2.

Preferably, the aminobenzoate is 4-[benzoyl(methyl)amino]pentan-2-yl benzoate:

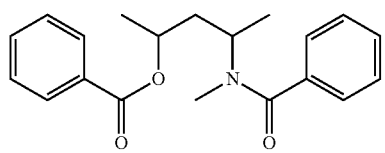 [SMILES: CC(CC(C)N(C)C(=O)c1ccccc1)OC(=O)c1ccccc1]

Other suitable internal donors are the following or one or more combination thereof, or in combination with the preferred internal donors cited above.

Benzoic acid esters (monocarboxylic aromatic esters) as shown in Formula V are suitable as internal donor

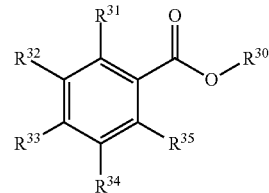

Formula V $R^{30}$ is selected from a hydrocarbyl group independently selected e.g. from alkyl, alkenyl, aryl, aralkyl, alkoxycarbonyl or alkylaryl groups, and one or more combinations thereof. Said hydrocarbyl group may be linear, branched or cyclic. Said hydrocarbyl group may be substituted or unsubstituted. Said hydrocarbyl group may contain one or more heteroatoms. Preferably, said hydrocarbyl group has between 1 and 10 carbon atoms, more preferably between 1-8 carbon atoms, even more preferably between 1 and 6 carbon atoms. Suitable examples of hydrocarbyl groups include alkyl-, cycloalkyl-, alkenyl-, alkadienyl-, cycloalkenyl-, cycloalkadienyl-, aryl-, aralkyl, alkylaryl, and alkynyl-groups.

$R^{31}$, $R^{32}$, $R^{33}$, $R^{34}$, $R^{35}$ are each independently selected from hydrogen, a heteroatom (preferably a halide), or a hydrocarbyl group, e.g. selected from e.g. alkyl, alkenyl, aryl, aralkyl, alkoxycarbonyl or alkylaryl groups, and one or more combinations thereof. Said hydrocarbyl group may be linear, branched or cyclic. Said hydrocarbyl group may be substituted or unsubstituted. Said hydrocarbyl group may contain one or more heteroatoms. Preferably, said hydrocarbyl group has between 1 and 10 carbon atoms, more preferably between 1-8 carbon atoms, even more preferably between 1 and 6 carbon atoms.

Suitable non-limiting examples of "benzoic acid esters" include an alkyl p-alkoxybenzoate (such as ethyl p-methoxybenzoate, methyl p-ethoxybenzoate, ethyl p-ethoxybenzoate), an alkyl benzoate (such as ethyl benzoate, methyl benzoate), an alkyl p-halobenzoate (ethyl p-chlorobenzoate, ethyl p-bromobenzoate), and benzoic anhydride. The benzoic acid ester is preferably selected from ethyl benzoate, benzoyl chloride, ethyl p-bromobenzoate, n-propyl benzoate and benzoic anhydride. The benzoic acid ester is more preferably ethyl benzoate.

A "1,3-di-ether" may be used as internal donor, viz. a 1,3-di(hydrocarboxy)propane compound, optionally substituted on the 2-position represented by the Formula VII,

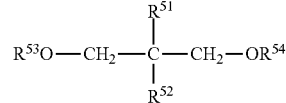

Formula VII $R^{51}$ and $R^{52}$ are each independently selected from a hydrogen or a hydrocarbyl group selected from alkyl, alkenyl, aryl, aralkyl, alkoxycarbonyl or alkylaryl groups, and one or more combinations thereof. Said hydrocarbyl group may be linear, branched or cyclic. Said hydrocarbyl group may be substituted or unsubstituted. Said hydrocarbyl group may contain one or more heteroatoms. Preferably, said hydrocarbyl group has between 1 and 10 carbon atoms, more preferably between 1-8 carbon atoms, even more preferably between 1 and 6 carbon atoms. Suitable examples of hydrocarbyl groups include alkyl-, cycloalkyl-, alkenyl-, alkadienyl-, cycloalkenyl-, cycloalkadienyl-, aryl-, aralkyl-, alkylaryl, and alkynyl-groups.

$R^{53}$ and $R^{54}$ are each independently selected from hydrogen, a halide or a hydrocarbyl group, e.g. selected from alkyl, alkenyl, aryl, aralkyl, alkoxycarbonyl or alkylaryl groups, and one or more combinations thereof. Said hydrocarbyl group may be linear, branched or cyclic. Said hydrocarbyl group may be substituted or unsubstituted. Said hydrocarbyl group may contain one or more heteroatoms. Preferably, said hydrocarbyl group has between 1 and 10 carbon atoms, more preferably between 1-8 carbon atoms, even more preferably between 1 and 6 carbon atoms.

Suitable examples of dialkyl diether compounds include 1,3-dimethoxypropane, 1,3-diethoxypropane, 1,3-dibutoxypropane, 1-methoxy-3-ethoxypropane, 1-methoxy-3-butoxypropane, 1-methoxy-3-cyclohexoxypropane, 2,2-dimethyl-1,3-dimethoxypropane, 2,2-diethyl-1,3-dimethoxypropane, 2,2-di-n-butyl-1,3-dimethoxypropane, 2,2-diiso-butyl-1,3-dimethoxypropane, 2-ethyl-2-n-butyl-1,3-dimethoxypropane, 2-n-propyl-2-cyclopentyl-1,3-dimethoxypropane, 2,2-dimethyl-1,3-diethoxypropane, 2-n-propyl-2-cyclohexyl-1,3-diethoxypropane, 2-(2-ethylhexyl)-1,3-dimethoxypropane, 2-isopropyl-1,3-dimethoxypropane, 2-n-butyl-1,3-dimethoxypropane, 2-sec-butyl-1,3-dimethoxypropane, 2-cyclohexyl-1,3-dimethoxypropane, 2-phenyl-1,3-diethoxypropane, 2-cumyl-1,3-diethoxypropane, 2-(2-phenyllethyl)-1,3-dimethoxypropane, 2-(2-cyclohexylethyl)-1,3-dimethoxypropane, 2-(p-chlorophenyl)-1,3-dimethoxypropane, 2-(diphenylmethyl)-1,3-dimethoxypropane, 2-(1-naphthyl)-1,3-dimethoxypropane, 2-(fluorophenyl)-1,3-dimethoxypropane, 2-(1-decahydronaphthyl)-1,3-dimethoxypropane, 2-(p-t-butylphenyl)-1,3-dimethoxypropane, 2,2-dicyclohexyl-1,3-dimethoxypropane, 2,2-di-npropyl-1,3-dimethoxypropane, 2-methyl-2-n-propyl-1,3-dimethoxypropane, 2-methyl-2-benzyl-1,3-dimethoxypropane, 2-methyl-2-ethyl-1,3-dimethoxypropane, 2-methyl-2-phenyl-1,3-dimethoxypropane, 2-methyl-2-cyclohexyl-1,3-dimethoxypropane, 2,2-bis(pchlorophenyl)-1,3-dimethoxypropane, 2,2-bis(2-cyclohexylethyl)-1,3-dimethoxypropane, 2-methyl-2-isobutyl-1,3-dimethoxypropane, 2-methyl-2-(2-ethylhexyl)-1,3-dimethoxy propane, 2-methyl-2-isopropyl-1,3-dimethoxypropane, 2,2-diphenyl-1,3-dimethoxypropane, 2,2-dibenzyl-1,3-dimethoxypropane, 2,2-bis(cyclohexylmethyl)-1,3-dimethoxypropane, 2,2-diiso butyl-1,3-diethoxypropane, 2,2-diisobutyl-1,3-di-n-butoxypropane, 2-isobutyl-2-isopropyl-1,3-dimethoxypropane, 2,2-di-sec-butyl-1,3-dimethoxypropane, 2,2-di-t-butyl-1,3-dimethoxypropane, 2,2-dineopentyl-1,3-dimethoxypropane, 2-isopropyl-2-isopentyl-1,3-dimethoxypropane, 2-phenyl-2-benzyl-1,3-dimethoxypropane, 2-cyclohexyl-2-cyclohexylmethyl-1,3-dimethoxypropane, 2-isopropyl-2-(3,7-dimethyloctyl) 1,3-dimethoxypropane, 2,2-diisopropyl-1,3-dimethoxypropane, 2-isopropyl-2-cyclohexylmethyl-1,3-dimethoxypropane, 2,2-diisopentyl-1,3-dimethoxypropane, 2-isopropyl-2-cyclohexyl-1,3-dimethoxypropane, 2-isopropyl-2-cyclopentyl-1,3-dimethoxypropane, 2,2-dicyclopentyl-1,3-dimethoxypropane, 2-n-heptyl-2-n-pentyl-1,3-dimethoxypropane, 9,9-bis(methoxymethyl)fluorene, 1,3-dicyclohexyl-2,2-bis(methoxymethyl)propane, 3,3-bis(methoxymethyl)-2,5-dimethylhexane, or any combination of the foregoing. In an embodiment, the internal electron donor is 1,3-dicyclohexyl-2,2-bis(methoxymethyl)propane, 3,3-bis(methoxymethyl)-2,5-dimethylhexane, 2,2-dicyclopentyl-1,3-dimethoxypropane and combinations thereof.

Examples of preferred ethers are diethyl ether, dibutyl ether, diisoamyl ether, anisole and ethylphenyl ether, 2,3-dimethoxypropane, 2,3-dimethoxypropane, 2-ethyl-2-butyl-1,3-dimethoxypropane, 2-isopropyl-2-isopentyl-1,3-dimethoxypropane and 9,9-bis (methoxymethyl) fluorene:

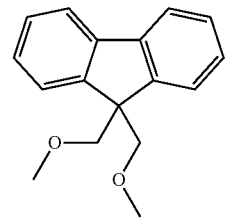 [SMILES: COCC1(COC)c2ccccc2-c2ccccc21]

A "succinate acid ester", viz a 1,2-dicarboxyethane according to Formula VIII can be used as internal donor.

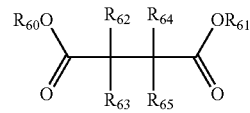

Formula VIII $R^{60}$ and $R^{61}$ are each independently a hydrocarbyl group, e.g. selected from alkyl, alkenyl, aryl, aralkyl, alkoxycarbonyl or alkylaryl groups, and one or more combinations thereof. Said hydrocarbyl group may be linear, branched or cyclic. Said hydrocarbyl group may be substituted or unsubstituted. Said hydrocarbyl group may contain one or more heteroatoms. Preferably, said hydrocarbyl group has between 1 and 10 carbon atoms, more preferably between 1-8 carbon atoms, even more preferably between 1 and 6 carbon atoms.

$R^{62}$, $R^{63}$, $R^{64}$, and $R^{65}$ are each independently selected from hydrogen or a hydrocarbyl group, e.g. selected from alkyl, alkenyl, aryl, aralkyl, alkoxycarbonyl or alkylaryl groups, and one or more combinations thereof. Said hydrocarbyl group may be linear, branched or cyclic. Said hydrocarbyl group may be substituted or unsubstituted. Said hydrocarbyl group may contain one or more heteroatoms. Preferably, said hydrocarbyl group has between 1 and 20 carbon atoms.

More preferably, $R^{62}$, $R^{63}$, $R^{64}$, and $R^{65}$ are independently selected from a group consisting of hydrogen, $C_1$-$C_{10}$ straight and branched alkyl; $C_3$-$C_{10}$ cycloalkyl; $C_6$-$C_{10}$ aryl; and $C_7$-$C_{10}$ alkaryl and aralkyl group.

Even more preferably, $R^{62}$, $R^{63}$, $R^{64}$, and $R^{65}$ are independently selected from a group consisting of hydrogen, methyl, ethyl, n-propyl, iso-propyl, n-butyl, sec-butyl, iso-butyl, t-butyl, phenyl trifluoromethyl and halophenyl group. Most preferably, one of $R^{62}$ and $R^{63}$ is selected from methyl, ethyl, n-propyl, iso-propyl, n-butyl, sec-butyl, iso-butyl, t-butyl, whereas the other is a hydrogen atom; and one of $R^{64}$ and $R^{65}$ is selected from methyl, ethyl, n-propyl, iso-propyl, n-butyl, sec-butyl, iso-butyl, t-butyl, whereas the other is a hydrogen atom Suitable examples of succinate acid ester include diethyl 2,3-di-isopropylsuccinate, diethyl 2,3-di-n-propylsuccinate, diethyl 2,3-di-isobutylsuccinate, diethyl 2,3-di-sec-butylsuccinate, dimethyl 2,3-di-isopropylsuccinate, dimethyl 2,3-di-n-propylsuccinate, dimethyl 2,3-di-isobutylsuccinate, dimethyl 2,3-di-sec-butylsuccinate.

The silyl ester as internal donor can be any silyl ester or silyl diol ester known in the art, for instance as disclosed in US 2010/0130709.

Examples of other organic compounds containing a heteroatom and suitable for internal donors are thiophenol, 2-methylthiophene, isopropyl mercaptan, diethylthioether, diphenylthio-ether, tetrahydrofuran, dioxane, anisole, acetone, triphenylphosphine, triphenylphosphite, diethylphosphate and diphenylphosphate.

The process according to the present invention results in procatalysts, which allow obtaining polyolefins in a high yield and with a high polymer bulk density.

The invention further relates to a procatalyst for polymerization of olefins obtained or obtainable by the process according to the invention.

The invention also relates to a catalyst system that comprises the procatalyst according to the invention and a co-catalyst. Preferably, the catalyst system also comprises an external electron-donating compound, also referred to as external electron donor, or simply external donor.

The catalyst system according to the present invention includes a co-catalyst. As used herein, a "co-catalyst" is a term well-known in the art in the field of Ziegler-Natta catalysts and is recognized to be a substance capable of converting the procatalyst to an active polymerization catalyst. Generally, the co-catalyst is an organometallic compound containing a metal from group 1, 2, 12 or 13 of the Periodic System of the Elements (Handbook of Chemistry and Physics, 70th Edition, CRC Press, 1989-1990).

The co-catalyst may include any compounds known in the art to be used as "co-catalysts", such as hydrides, alkyls, or aryls of aluminum, lithium, zinc, tin, cadmium, beryllium, magnesium, and combinations thereof. The co-catalyst may be a hydrocarbyl aluminum co-catalyst represented by the formula $R^{20}_3Al$.

$R^{20}$ is independently selected from a hydrogen or a hydrocarbyl, e.g. selected from alkyl, alkenyl, aryl, aralkyl, alkoxycarbonyl or alkylaryl groups, and one or more combinations thereof. Said hydrocarbyl group may be linear, branched or cyclic. Said hydrocarbyl group may be substituted or unsubstituted. Said hydrocarbyl group may contain one or more heteroatoms. Preferably, said hydrocarbyl group has from 1 to 20 carbon atoms, more preferably from 1 to 12 carbon atoms, even more preferably from 1 to 6 carbon atoms. On the proviso that at least one $R^{20}$ is a hydrocarbyl group. Optionally, two or three $R^{20}$ groups are joined in a cyclic radical forming a heterocyclic structure.

Non-limiting examples of suitable $R^{20}$ groups are: methyl, ethyl, propyl, isopropyl, butyl, isobutyl, t-butyl, pentyl, neopentyl, hexyl, 2-methylpentyl, heptyl, octyl, isooctyl, 2-ethylhexyl, 5,5-dimethylhexyl, nonyl, decyl, isodecyl, undecyl, dodecyl, phenyl, phenethyl, methoxyphenyl, benzyl, tolyl, xylyl, naphthyl, methylnapthyl, cyclohexyl, cycloheptyl, and cyclooctyl.

Suitable examples of the hydrocarbyl aluminum compounds as co-catalyst include triisobutylaluminum (TIBA), trihexylaluminum, di-isobutylaluminum hydride (DIBALH), dihexylaluminum hydride, isobutylaluminum dihydride, hexylaluminum dihydride, diisobutylhexylalumi-num, isobutyl dihexylaluminum, trimethylaluminum, triethylaluminum, tripropylaluminum, triisopropylaluminum, tri-n-butylaluminum, trioctylaluminum, tridecylaluminum, tridodecylaluminum, tribenzylaluminum, triphenylaluminum, trinaphthylaluminum, and tritolylaluminum. In an embodiment, the co-catalyst is selected from triethylaluminum, triisobutylaluminum, trihexylaluminum, di-isobutylaluminum hydride and dihexylaluminum hydride. More preferably, trimethylaluminum, triethylaluminum, triisobutylaluminum, and/or trioctylaluminum. Most preferably, triethylaluminum (abbreviated as TEAL).

The co-catalyst can also be a hydrocarbyl aluminum compound represented by the formula $R^{21}_m AlX^{21}_{3-m}$.[1]

$R^{21}$ is an alkyl group. Said alkyl group may be linear, branched or cyclic. Said alkyl group may be substituted or unsubstituted. Preferably, said alkyl group has from 1 to 20 carbon atoms, more preferably from 1 to 12 carbon atoms, even more preferably from 1 to 6 carbon atoms.

Non-limiting examples of suitable $R^{21}$ groups are: methyl, ethyl, propyl, isopropyl, butyl, isobutyl, t-butyl, pentyl, neopentyl, hexyl, 2-methylpentyl, heptyl, octyl, isooctyl, 2-ethylhexyl, 5,5-dimethylhexyl, nonyl, decyl, isodecyl, undecyl, and dodecyl.

$X^{21}$ is selected from the group of consisting of fluoride (F—), chloride (Cl—), bromide (Br—) or iodide (I—) or an alkoxide (RO−). The value for m is preferably 1 or 2.

Non-limiting examples of suitable alkyl aluminum halide compounds for co-catalyst include tetraethyl-dialuminoxane, methylaluminoxane, isobutylaluminoxane, tetraisobutyl-dialuminoxane, diethyl-aluminumethoxide, diisobutylaluminum chloride, methylaluminum dichloride, diethylaluminum chloride, ethylaluminum dichloride and dimethylaluminum chloride.

Non-limiting examples of suitable compounds include tetraethyldialuminoxane, methylaluminoxane, isobutylaluminoxane, tetraisobutyldialuminoxane, diethylaluminum ethoxide, diisobutylaluminum chloride, methylaluminum dichloride, diethylaluminum chloride, ethylaluminum dichloride and dimethylaluminum chloride.

Preferably, the co-catalyst is triethylaluminum. The molar ratio of aluminum to titanium may be from about 5:1 to about 500:1 or from about 10:1 to about 200:1 or from about 15:1 to about 150:1 or from about 20:1 to about 100:1. The molar ratio of aluminum to titanium is preferably about 45:1.

One of the functions of an external donor compound is to affect the stereoselectivity of the catalyst system in polymerization of olefins having three or more carbon atoms. Therefore it may be also referred to as a selectivity control agent.

Examples of external donors suitable for use in the present invention are the internal donors benzoic acid esters and 1,3-diethers. In addition, the following external donors may be used: alkylamino-alkoxysilanes, alkyl-alkoxysilane, imidosilanes, and alkylimidosilanes.

The aluminum/external donor molar ratio in the polymerization catalyst system preferably is from 0.1 to 200; more preferably from 1 to 100.

Mixtures of external donors may be present and may include from about 0.1 mol. % to about 99.9 mol. % of a first external donor and from about 99.9 mol. % to about 0.1 mol. % of either a second or the additional alkoxysilane external donor disclosed below.

When a silane external donor is used, the Si/Ti molar ratio in the catalyst system can range from 0.1 to 40, preferably from 0.1 to 20, even more preferably from 1 to 20 and most preferably from 2 to 10.

Documents EP1538167 and EP1783145 disclose a Ziegler-Natta catalyst type comprising an organo-silicon compound as external donor that is represented by formula $Si(OR^c)_3(NR^dR^e)$, wherein $R^c$ is a hydrocarbon group having 1 to 6 carbon atoms, $R^d$ is a hydrocarbon group having 1 to 12 carbon atoms or hydrogen atom, and $R^e$ is a hydrocarbyl group having 1 to 12 carbon atoms used as an external electron donor.

An other example of a suitable external donor according to the present invention is a compound according to Formula III:

  Formula III

The $R^{90}$ and $R^{91}$ groups are each independently an alkyl having from 1 to 10 carbon atoms. Said alkyl group may be linear, branched or cyclic. Said alkyl group may be substituted or unsubstituted. Preferably, said hydrocarbyl group has from 1 to 8 carbon atoms, even more preferably from 1 to 6 carbon atoms, even more preferably from 2 to 4 carbon atoms. Preferably each $R^{90}$ is ethyl. Preferably, each $R^{91}$ is ethyl. A is either a direct bond between nitrogen and silicon or a spacer selected from an alkyl having 1-10 carbon atoms, preferably a direct bond; in other words, A is not present.

An example of such an external donor is diethyl-amino-triethoxysilane (DEATES) wherein A is a direct bond, each $R^{90}$ is ethyl and each $R^{91}$ is ethyl.

Alkyl-alkoxysilanes according to Formula IV may be used as external donors.

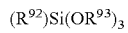  Formula IV

The $R^{92}$ and $R^{93}$ groups are each independently an alkyl having from 1 to 10 carbon atoms. Said alkyl group may be linear, branched or cyclic. Said alkyl group may be substituted or unsubstituted. Preferably, said hydrocarbyl group has from 1 to 8 carbon atoms, even more preferably from 1 to 6 carbon atoms, even more preferably from 2 to 4 carbon atoms. Preferably, all three $R^{93}$ groups are the same. Preferably $R^{93}$ is methyl or ethyl. Preferably $R^{92}$ is ethyl or propyl, more preferably n-propyl.

Examples are n-propyl triethoxysilane (nPTES) and n-propyl trimethoxysilane (nPTMS) and cyclohexylmethyl-dimethoxysilane (C-donor).

Typical external donors known in the art (for instance as disclosed in documents WO2006/056338A1, EP1838741B1, U.S. Pat. No. 6,395,670B1, EP398698A1, WO96/32426A) are organosilicon compounds having general formula $Si(OR^a)_{4-n}R^b_n$, wherein n can be from 0 up to 2, and each $R^a$ and $R^b$, independently, represents an alkyl or aryl group, optionally containing one or more hetero atoms for instance O, N, S or P, with, for instance, 1-20 carbon atoms; such as n-propyl trimethoxysilane (nPTMS), n-propyl triethoxysilane (nPEMS), diisobutyl dimethoxysilane (DiBDMS), t-butyl isopropyl dimethyxysilane (tBiPDMS), cyclohexyl methyldimethoxysilane (CHMDMS), dicyclopentyl dimethoxysilane (DCPDMS) or di(iso-propyl) dimethoxysilane (DiPDMS).

Imidosilanes according to Formula I may be used as external donors.

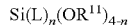  Formula I wherein,
Si is a silicon atom with valency 4+;
O is an oxygen atom with valency 2− and O is bonded to Si via a silicon-oxygen bond;
n is 1, 2, 3 or 4;
$R^{11}$ is selected from the group consisting of linear, branched and cyclic alkyl having at most 20 carbon atoms and aromatic substituted and unsubstituted hydrocarbyl having 6 to 20 carbon atoms; two $R^{11}$ groups can be connected and together may form a cyclic structure; and L is a group represented by Formula I''

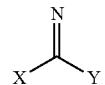  Formula I'' wherein,
L is bonded to the silicon atom via a nitrogen-silicon bond;
L has a single substituent on the nitrogen atom, where this single substituent is an imine carbon atom; and
X and Y are each independently selected from the group consisting of:
a) a hydrogen atom;
b) a group comprising a heteroatom selected from group 13, 14, 15, 16 or 17 of the IUPAC Periodic Table of the Elements, through which X and Y are each independently bonded to the imine carbon atom of Formula II, wherein the heteroatom is substituted with a group consisting of a linear, branched and cyclic alkyl having at most 20 carbon atoms, optionally containing a heteroatom selected from group 13, 14, 15, 16 or 17 of the IUPAC Periodic Table of the Elements; and/or with an aromatic substituted and unsubstituted hydrocarbyl having 6 to 20 carbon atoms, optionally containing a heteroatom selected from group 13, 14, 15, 16 or 17 of the IUPAC Periodic Table of the Elements;
c) a linear, branched and cyclic alkyl having at most 20 carbon atoms, optionally containing a heteroatom selected from group 13, 14, 15, 16 or 17 of the IUPAC Periodic Table of the Elements; and
d) an aromatic substituted and unsubstituted hydrocarbyl having 6 to 20 carbon atoms, optionally containing a heteroatom selected from group 13, 14, 15, 16 or 17 of the IUPAC.

In a preferred embodiment, at least one of X and Y is selected from b), c) or d). In other words, in said preferred embodiment, X and Y are not both hydrogen.

$R^{11}$ is selected from the group consisting of linear, branched and cyclic alkyl having at most 20 carbon atoms.

Preferably, $R^{11}$ is a selected from the group consisting of linear, branched and cyclic alkyl having at most 20 carbon atoms, preferably 1 to 10 carbon atoms or 3 to 10 carbon atoms, more preferably 1 to 6 carbon atoms.

Suitable examples of $R^{11}$ include methyl, ethyl, n-propyl, iso-propyl, n-butyl, iso-butyl, t-butyl, sec-butyl, iso-butyl, n-pentyl, iso-pentyl, cyclopentyl, n-hexyl and cyclohexyl. More preferably, $R^{11}$ is a linear alkyl having 1 to 10, even more preferably 1 to 6 carbon atoms. Most preferably, $R^{11}$ is methyl or ethyl.

$R^{12}$ is selected from the group consisting of a linear, branched and cyclic hydrocarbyl group independently selected e.g. from alkyl, alkenyl, aryl, aralkyl, alkoxycarbonyl or alkylaryl groups, and one or more combinations thereof. Said hydrocarbyl group may be substituted or unsubstituted. Said hydrocarbyl group may contain one or more heteroatoms. Preferably, said hydrocarbyl group has from 1 to 20 carbon atoms.

Suitable examples of $R^{12}$ include methyl, ethyl, n-propyl, iso-propyl, n-butyl, iso-butyl, t-butyl, sec-butyl, iso-butyl, n-pentyl, iso-pentyl, cyclopentyl, n-hexyl, cyclohexyl, unsubstituted or substituted phenyl.

Specific examples are the following compounds: 1,1,1-triethoxy-N-(2,2,4,4-tetramethylpentan-3-ylidene) silanamine (all $R^{11}$ groups are =ethyl and X and Y are both t-butyl); 1,1,1-trimethoxy-N-(2,2,4,4-tetramethylpentan-3-ylidene) silanamine (all $R^{11}$ groups are methyl, and X and Y are tert butyl), N,N,N',N'-tetramethylguanidine triethoxysilane (all R11 groups are ethyl, both X and Y are dimethylamino).

Alkylimidosilanes according to Formula I' may be used as external donors.

$$Si(L)_n(OR^{11})_{4-n-m}(R^{12})_m \quad \text{Formula I'}$$

wherein,

Si is a silicon atom with valency 4+;

O is an oxygen atom with valency 2– and O is bonded to Si via a silicon-oxygen bond;

n is 1, 2, 3 or 4;

m is 0, 1 or 2 n+m≤4

$R^{11}$ is selected from the group consisting of linear, branched and cyclic alkyl having at most 20 carbon atoms and aromatic substituted and unsubstituted hydrocarbyl having 6 to 20 carbon atoms; and $R^{12}$ is selected from the group consisting of linear, branched and cyclic alkyl having at most 20 carbon atoms and aromatic substituted and unsubstituted hydrocarbyl having 6 to 20 carbon atoms;

L is a group represented by Formula I"

Formula I"

wherein,

L is bonded to the silicon atom via a nitrogen-silicon bond;

L has a single substituent on the nitrogen atom, where this single substituent is an imine carbon atom; and X and Y are each independently selected from the group consisting of:

a) a hydrogen atom;

b) a group comprising a heteroatom selected from group 13, 14, 15, 16 or 17 of the IUPAC Periodic Table of the Elements, through which X and Y are each independently bonded to the imine carbon atom of Formula II, wherein the heteroatom is substituted with a group consisting of a linear, branched and cyclic alkyl having at most 20 carbon atoms, optionally containing a heteroatom selected from group 13, 14, 15, 16 or 17 of the IUPAC Periodic Table of the Elements; and/or with an aromatic substituted and unsubstituted hydrocarbyl having 6 to 20 carbon atoms, optionally containing a heteroatom selected from group 13, 14, 15, 16 or 17 of the IUPAC Periodic Table of the Elements;

c) a linear, branched and cyclic alkyl having at most 20 carbon atoms, optionally containing a heteroatom selected from group 13, 14, 15, 16 or 17 of the IUPAC Periodic Table of the Elements; and d) an aromatic substituted and unsubstituted hydrocarbyl having 6 to 20 carbon atoms, optionally containing a heteroatom selected from group 13, 14, 15, 16 or 17 of the IUPAC Periodic Table of the Elements.

In a preferred embodiment, at least one of X and Y is selected from b), c) or d). In other words, in said preferred embodiment, X and Y are not both hydrogen $R^{11}$ is selected from the group consisting of linear, branched and cyclic alkyl having at most 20 carbon atoms.

Preferably, $R^{11}$ is a selected from the group consisting of linear, branched and cyclic alkyl having at most 20 carbon atoms, preferably 1 to 10 carbon atoms or 3 to 10 carbon atoms, more preferably 1 to 6 carbon atoms.

Suitable examples of $R^{11}$ include methyl, ethyl, n-propyl, iso-propyl, n-butyl, iso-butyl, t-butyl, sec-butyl, iso-butyl, n-pentyl, iso-pentyl, cyclopentyl, n-hexyl and cyclohexyl. More preferably, $R^{11}$ is a linear alkyl having 1 to 10, even more preferably 1 to 6 carbon atoms. Most preferably, $R^{11}$ is methyl or ethyl.

$R^{12}$ is selected from the group consisting of a linear, branched and cyclic hydrocarbyl group independently selected e.g. from alkyl, alkenyl, aryl, aralkyl, alkoxycarbonyl or alkylaryl groups, and one or more combinations thereof. Said hydrocarbyl group may be substituted or unsubstituted. Said hydrocarbyl group may contain one or more heteroatoms. Preferably, said hydrocarbyl group has from 1 to 20 carbon atoms.

Suitable examples of $R^{12}$ include methyl, ethyl, n-propyl, iso-propyl, n-butyl, iso-butyl, t-butyl, sec-butyl, iso-butyl, n-pentyl, iso-pentyl, cyclopentyl, n-hexyl, cyclohexyl, unsubstituted or substituted phenyl.

In a first specific example, the external donor may have a structure corresponding to Formula I' wherein n=1, m=2, X=Y=phenyl, both $R^{12}$ groups are methyl, and $R^{11}$ is butyl.

In a second specific example, the external donor may have a structure corresponding to Formula I' wherein n=4, m=0, X=methyl, and Y=ethyl.

In a third specific example, the external donor may have a structure corresponding to Formula I' wherein n=1, m=1, X=phenyl, Y=—CH$_2$—Si(CH$_3$)$_3$, and $R^{12}$=$R^{11}$=methyl.

In a fourth specific example, the external donor may have a structure corresponding to Formula I' wherein n=1, m=1, X=—NH—C=NH(NH$_2$)—, Y=—NH—(CH$_2$)$_3$—Si(OCH$_2$CH$_3$)$_3$, and $R^{12}$=—(CH$_2$)$_3$—NH$_2$; $R^{11}$=ethyl.

The additional compound(s) in the external donor according to the invention may be one or more alkoxysilanes. The alkoxysilane compound can have any of the structures disclosed herein. The alkoxysilane is described by Formula IX $$SiR^7_r(OR^8)_{4-r} \quad \text{Formula IX}$$

$R^7$ is independently a hydrocarbyl, e.g. selected from alkyl, alkenyl, aryl, aralkyl, alkoxycarbonyl or alkylaryl groups, and one or more combinations thereof. Said hydrocarbyl group may be linear, branched or cyclic. Said hydrocarbyl group may be substituted or unsubstituted. Said hydrocarbyl group may contain one or more heteroatoms. Preferably, said hydrocarbyl group has from 1 to 20 carbon atoms, more preferably from 6 to 12 carbon atoms, even more preferably from 3 to 12 carbon atoms. For example, $R^7$ may be C6-12 aryl, alkyl or aralkyl, C3-12 cycloalkyl, C3-12 branched alkyl, or C3-12 cyclic or acyclic amino group. The value for r is selected from 1 or 2. from 1 to For the formula SiNR$^7$r(OR$^8$)$_{4-r}$R$^7$ may also be hydrogen.

$R^8$ is independently selected from a hydrogen or a hydrocarbyl, e.g. selected from alkyl, alkenyl, aryl, aralkyl, alkoxycarbonyl or alkylaryl groups, and one or more combinations thereof. Said hydrocarbyl group may be linear, branched or cyclic. Said hydrocarbyl group may be substituted or unsubstituted. Said hydrocarbyl group may contain one or more heteroatoms. Preferably, said hydrocarbyl group has from 1 to 20 carbon atoms, more preferably from 1 to 12 carbon atoms, even more preferably from 1 to 6 carbon atoms. For example, $R^8$ may be C1-4 alkyl, preferably methyl or ethyl Non-limiting examples of suitable silane-compounds include tetramethoxysilane (TMOS or tetramethyl orthosilicate), tetraethoxysilane (TEOS or tetraethyl orthosilicate), methyl trimethoxysilane, methyl triethoxysilane, methyl tripropoxysilane, methyl tributoxysilane, ethyl trimethoxysilane, ethyl triethoxysilane, ethyl tripropoxysilane, ethyl tributoxysilane, n-propyl trimethoxysilane, n-propyl triethoxysilane, n-propyl tripropoxysilane, n-propyl tributoxysilane, isopropyl trimethoxysilane, isopropyl triethoxysilane, isopropyl tripropoxysilane, isopropyl tributoxysilane, phenyl trimethoxysilane, phenyl triethoxysilane, phenyl tripropoxysilane, phenyl tributoxysilane, cyclopentyl trimethoxysilane, cyclopentyl triethoxysilane, diethylamino triethoxysilane, dimethyl dimethoxysilane, dimethyl diethoxysilane, dimethyl dipropoxysilane, dimethyl dibutoxysilane, diethyl dimethoxysilane, diethyl diethoxysilane, diethyl dipropoxysilane, diethyl dibutoxysilane, di-n-propyl dimethoxysilane, d-n-propyl diethoxysilane, di-n-propyl dipropoxysilane, di-n-propyl dibutoxysilane, diisopropyl dimethoxysilane, diisopropyl diethoxysilane, diisopropyl dipropoxysilane, diisopropyl dibutoxysilane, diphenyl dimethoxysilane, diphenyl diethoxysilane, diphenyl dipropoxysilane, diphenyl dibutoxysilane, dicyclopentyl dimethoxysilane, dicyclopentyl diethoxysilane, diethyl diphenoxysilane, di-t-butyl dimethoxysilane, methyl cyclohexyl dimethoxysilane, ethyl cyclohexyl dimethoxysilane, isobutyl isopropyl dimethoxysilane, t-butyl isopropyl dimethoxysilane, trifluoropropyl methyl dimethoxysilane, bis(perhydroisoquinolino) dimethoxysilane, dicyclohexyl dimethoxysilane, dinorbornyl dimethoxysilane, cyclopentyl pyrrolidino dimethoxysilane and bis(pyrrolidino) dimethoxysilane.

In an embodiment, the silane-compound for the additional external donor is dicyclopentyl dimethoxysilane, di-isopropyl dimethoxysilane, di-isobutyl dimethyoxysilane, methylcyclohexyl dimethoxysilane, n-propyl trimethoxysilane, n-propyltriethoxysilane, dimethylamino triethoxysilane, and one or more combinations thereof.

Preferably, the external donor is an alkyl-alkoxysilane according to formula IV (preferably n-propyl trimethoxysilane or n-propyl triethoxysilane) or cyclohexylmethyldimethoxysilane or another dialkyldialkoxysilane.

The aluminum/external donor molar ratio in the polymerization catalyst system preferably is from 0.1 to 200; more preferably from 1 to 100.

The invention also relates to a process to make the catalyst system by contacting a Ziegler-Natta type procatalyst, a co-catalyst and an external electron donor. The procatalyst, the co-catalyst and the external donor can be contacted in any way known to the skilled person in the art; and as also described herein, more specifically as in the Examples.

The invention further relates to a process of preparing a polyolefin by contacting at least one olefin with a polymerization catalyst system comprising the procatalyst according to the present invention. Preferably, the polyolefin made by using the catalyst system of the present invention is a polypropylene. It is an advantage of the present invention that polyolefins are obtained in a higher yield then when non-modified prior art procatalysts are used.

For instance, the external donor in the catalyst system according to the present invention can be complexed with the co-catalyst and mixed with the procatalyst (pre-mix) prior to contact between the catalyst composition and the olefin. The external donor can also be added independently to the polymerization reactor. The procatalyst, the co-catalyst, and the external donor can be mixed or otherwise combined prior to addition to the polymerization reactor.

Contacting the olefin with the catalyst system according to the present invention can be done under standard polymerization conditions, known to the skilled person in the art. See for example Pasquini, N. (ed.) "Polypropylene handbook" $2^{nd}$ edition, Carl Hanser Verlag Munich, 2005. Chapter 6.2 and references cited therein.

The polymerization process may be a gas phase, a slurry or a bulk polymerization process, operating in one or more than one reactor. One or more olefin monomers can be introduced in a polymerization reactor to react with the catalyst composition and to form an olefin-based polymer (or a fluidized bed of polymer particles).

In the case of polymerization in a slurry (liquid phase), a dispersing agent is present. Suitable dispersing agents include for example propane, n-butane, isobutane, n-pentane, isopentane, hexane (e.g. iso- or n-), heptane (e.g. iso- or n-), octane, cyclohexane, benzene, toluene, xylene, liquid propylene and/or mixtures thereof. The polymerization such as for example the polymerization temperature and time, monomer pressure, avoidance of contamination of catalyst, choice of polymerization medium in slurry processes, the use of further ingredients (like hydrogen) to control polymer molar mass, and other conditions are well known to persons of skill in the art. The polymerization temperature may vary within wide limits and is, for example for propylene polymerization, from 0° C. to 120° C., preferably from 40° C. to 100° C. The pressure during (propylene) (co)polymerization is for instance from 0.1 to 6 MPa, preferably from 1 to 4 MPa.

Several types of polyolefins are prepared such as homopolyolefins, random copolymers and heterophasic polyolefin. The for latter, and especially heterophasic polypropylene, the following is observed.

Heterophasic propylene copolymers are generally prepared in one or more reactors, by polymerization of propylene and optionally one or more other olefins, for example ethylene, in the presence of a catalyst and subsequent polymerization of a propylene-α-olefin mixture. The resulting polymeric materials can show multiple phases (depending on monomer ratio), but the specific morphology usually depends on the preparation method and monomer ratio. The heterophasic propylene copolymers employed in the process according to present invention can be produced using any conventional technique known to the skilled person, for example multistage process polymerization, such as bulk polymerization, gas phase polymerization, slurry polymerization, solution polymerization or any combinations thereof. Any conventional catalyst systems, for example, Ziegler-Natta or metallocene may be used. Such techniques and catalysts are described, for example, in WO06/010414; Polypropylene and other Polyolefins, by Ser van der Ven, Studies in Polymer Science 7, Elsevier 1990; WO06/010414, U.S. Pat. No. 4,399,054 and U.S. Pat. No. 4,472,524.

The molar mass of the polyolefin obtained during the polymerization can be controlled by adding hydrogen or any other agent known to be suitable for the purpose during the polymerization. The polymerization can be carried out in a continuous mode or batch-wise. Slurry-, bulk-, and gas-phase polymerization processes, multistage processes of each of these types of polymerization processes, or combinations of the different types of polymerization processes in a multistage process are contemplated herein. Preferably, the polymerization process is a single stage gas phase process or a multistage, for instance a two-stage gas phase process, e.g. wherein in each stage a gas-phase process is used or including a separate (small) prepolymerization reactor.

Examples of gas-phase polymerization processes include both stirred bed reactors and fluidized bed reactor systems; such processes are well known in the art. Typical gas phase olefin polymerization reactor systems typically comprise a reactor vessel to which an olefin monomer(s) and a catalyst system can be added and which contain an agitated bed of growing polymer particles. Preferably the polymerization process is a single stage gas phase process or a multistage, for instance a 2-stage, gas phase process wherein in each stage a gas-phase process is used.

As used herein, "gas phase polymerization" is the way of an ascending fluidizing medium, the fluidizing medium containing one or more monomers, in the presence of a catalyst through a fluidized bed of polymer particles maintained in a fluidized state by the fluidizing medium optionally assisted by mechanical agitation. Examples of gas phase polymerization are fluid bed, horizontal stirred bed and vertical stirred bed.

"fluid-bed," "fluidized," or "fluidizing" is a gas-solid contacting process in which a bed of finely divided polymer particles is elevated and agitated by a rising stream of gas optionally assisted by mechanical stirring. In a "stirred bed" upwards gas velocity is lower than the fluidization threshold.

A typical gas-phase polymerization reactor (or gas phase reactor) include a vessel (i.e., the reactor), the fluidized bed, a product discharge system and may include a mechanical stirrer, a distribution plate, inlet and outlet piping, a compressor, a cycle gas cooler or heat exchanger. The vessel may include a reaction zone and may include a velocity reduction zone, which is located above the reaction zone (viz. the bed). The fluidizing medium may include propylene gas and at least one other gas such as an olefin and/or a carrier gas such as hydrogen or nitrogen. The contacting can occur by way of feeding the catalyst composition into the polymerization reactor and introducing the olefin into the polymerization reactor. In an embodiment, the process includes contacting the olefin with a co-catalyst. The co-catalyst can be mixed with the procatalyst (pre-mix) prior to the introduction of the procatalyst into the polymerization reactor. The co-catalyst may be also added to the polymerization reactor independently of the procatalyst. The independent introduction of the co-catalyst into the polymerization reactor can occur (substantially) simultaneously with the procatalyst feed. An external donor may also be present during the polymerization process.

The olefin according to the invention may be selected from mono- and di-olefins containing from 2 to 40 carbon atoms. Suitable olefin monomers include alpha-olefins, such as ethylene, propylene, alpha-olefins having from 4 to 20 carbon atoms (viz. C4-20), such as 1-butene, 1-pentene, 1-hexene, 4-methyl-1-pentene, 1-heptene, 1-octene, 1-decene, 1-dodecene and the like; C4-C20 diolefins, such as 1,3-butadiene, 1,3-pentadiene, norbornadiene, 5-vinyl-2-norbornene (VNB), 1,4-hexadiene, 5-ethylidene-2-norbornene (ENB) and dicyclopentadiene; vinyl aromatic compounds having from 8 to 40 carbon atoms (viz. C8-C40) including styrene, o-, m- and p-methylstyrene, divinylbenzene, vinylbiphenyl, vinylnapthalene; and halogen-substituted C8-C40 vinyl aromatic compounds such as chlorostyrene and fluorostyrene.

Preferably, the olefin is propylene or a mixture of propylene and ethylene, to result in a propylene-based polymer, such as propylene homopolymer or propylene-olefin copolymer. The olefin may an alpha-olefin having up to 10 carbon atoms, such as ethylene, butane, hexane, heptane, octene. A propylene copolymer is herein meant to include both so-called random copolymers which typically have relatively low comonomer content, e.g. up to 10 mol. %, as well as so-called impact PP copolymers or heterophasic PP copolymers comprising higher comonomer contents, e.g. from 5 to 80 mol. %, more typically from 10 to 60 mol. %. The impact PP copolymers are actually blends of different propylene polymers; such copolymers can be made in one or two reactors and can be blends of a first component of low comonomer content and high crystallinity, and a second component of high comonomer content having low crystallinity or even rubbery properties. Such random and impact copolymers are well-known to the skilled in the art. A propylene-ethylene random copolymer may be produced in one reactor. Impact PP copolymers may be produced in two reactors: polypropylene homopolymer may be produced in a first reactor; the content of the first reactor is subsequently transferred to a second reactor into which ethylene (and optionally propylene) is introduced. This results in production of a propylene-ethylene copolymer (i.e. an impact copolymer) in the second reactor.

The present invention also relates to a polyolefin, preferably a polypropylene obtained or obtainable by a process, comprising contacting an olefin, preferably propylene or a mixture of propylene and ethylene with the procatalyst according to the present invention. The terms polypropylene and propylene-based polymer are used herein interchangeable. The polypropylene may be a propylene homopolymer or a mixture of propylene and ethylene, such as a propylene-based copolymer, e.g. heterophasic propylene-olefin copolymer; random propylene-olefin copolymer, preferably the olefin in the propylene-based copolymers being a C2, or C4-C6 olefin, such as ethylene, butylene, pentene or hexene. Such propylene-based (co)polymers are known to the skilled person in the art; they are also described herein above.

The present invention also relates to a polyolefin, preferably a propylene-based polymer obtained or obtainable by a process as described herein above, comprising contacting propylene or a mixture of propylene and ethylene with a catalyst system according to the present invention.

In one embodiment the present invention relates to the production of a homopolymer of polypropylene. For such a polymer, properties such as isotacticity and stiffness and emission may be important. Several polymer properties are discussed here.

The polyolefin, preferably the polypropylene according to the present invention has a molecular weight distribution higher than 3.5, preferably higher than 4, more preferably higher than 4.5 and for instance below 10 or below 9 or even below 6. The molecular weight distribution of the polyolefins, preferably polypropylene according to the present invention is for instance from 3.5 to 9, preferably from 4 to 6, more preferably from 4.5 to 6.

Xylene soluble fraction (XS) is preferably from about 0.5 wt. % to about 10 wt. %, or from about 1 wt. % to about 8 wt. %, or from 2 to 6 wt. %, or from about 1 wt. % to about 5 wt. %. Preferably, the xylene amount (XS) is lower than 6 wt. %, preferably lower than 5 wt. %, more preferably lower than 4 wt. % or even lower than 3 wt. % and most preferably lower than 2.7 wt. %.

The production rate is preferably from about 1 kg/g/hr to about 100 kg/g/hr, or from about 10 kg/g/hr to about 40 kg/g/hr.

The olefin polymer obtained in the present invention is considered to be a thermoplastic polymer. The thermoplastic polymer composition according to the invention may also contain one or more of usual additives, like those mentioned above, including stabilizers, e.g. heat stabilizers, anti-oxidants, UV stabilizers; colorants, like pigments and dyes; clarifiers; surface tension modifiers; lubricants; flame-retardants; mold-release agents; flow improving agents; plasticizers; anti-static agents; impact modifiers; blowing agents; fillers and reinforcing agents; and/or components that enhance interfacial bonding between polymer and filler, such as a maleated polypropylene, in case the thermoplastic polymer is a polypropylene composition. The skilled person can readily select any suitable combination of additives and additive amounts without undue experimentation.

The amount of additives depends on their type and function; typically is of from 0 to about 30 wt. %; preferably of from 0 to about 20 wt. %; more preferably of from 0 to about 10 wt. % and most preferably of from 0 to about 5 wt. % based on the total composition. The sum of all components added in a process to form the polyolefins, preferably the propylene-base polymers or compositions thereof should add up to 100 wt. %.

The thermoplastic polymer composition of the invention may be obtained by mixing one or more of the thermoplastic polymers with one or more additives by using any suitable means. Preferably, the thermoplastic polymer composition of the invention is made in a form that allows easy processing into a shaped article in a subsequent step, like in pellet or granular form. The composition can be a mixture of different particles or pellets; like a blend of a thermoplastic polymer and a master batch of nucleating agent composition, or a blend of pellets of a thermoplastic polymer comprising one of the two nucleating agents and a particulate comprising the other nucleating agent, possibly pellets of a thermoplastic polymer comprising said other nucleating agent. Preferably, the thermoplastic polymer composition of the invention is in pellet or granular form as obtained by mixing all components in an apparatus like an extruder; the advantage being a composition with homogeneous and well-defined concentrations of the nucleating agents (and other components).

The invention also relates to the use of the polyolefins, preferably the propylene-based polymers (also called polypropylenes) according to the invention in injection molding, blow molding, extrusion molding, compression molding, casting, thin-walled injection molding, etc. for example in food contact applications.

Furthermore, the invention relates to a shaped article comprising the polyolefin, preferably the propylene-based polymer according to the present invention.

The polyolefin, preferably the propylene-based polymer according to the present invention may be transformed into shaped (semi)-finished articles using a variety of processing techniques. Examples of suitable processing techniques include injection molding, injection compression molding, thin wall injection molding, extrusion, and extrusion compression molding. Injection molding is widely used to produce articles such as for example caps and closures, batteries, pails, containers, automotive exterior parts like bumpers, automotive interior parts like instrument panels, or automotive parts under the bonnet. Extrusion is for example widely used to produce articles, such as rods, sheets, films and pipes. Thin wall injection molding may for example be used to make thin wall packaging applications both for food and non-food segments. This includes pails and containers and yellow fats/margarine tubs and dairy cups.

It was shown that the modified catalyst provides polymer resins having an improved resin morphology compared to non-modified catalyst.

It is noted that the invention relates to all possible combinations of features recited in the claims. Features described in the description may further be combined.

Although the invention has been described in detail for purposes of illustration, it is understood that such detail is solely for that purpose and variations can be made therein by those skilled in the art without departing from the spirit and scope of the invention as defined in the claims.

It is further noted that the invention relates to all possible combinations of features described herein, preferred in particular are those combinations of features that are present in the claims.

It is further noted that the term 'comprising' does not exclude the presence of other elements. However, it is also to be understood that a description on a product comprising certain components also discloses a product consisting of these components. Similarly, it is also to be understood that a description on a process comprising certain steps also discloses a process consisting of these steps.

The invention will be further elucidated with the following examples without being limited hereto.

EXAMPLES

For the present examples two different internal donors have been tested, viz. di-isobutyl phthalate (Procatalyst B) and 4-[benzoyl(methyl)amino]pentan-2-yl benzoate in combination with ethylbenzoate as activator (Procatalysts C and D).

Preparation of Phenyl-Grignard Reagent (Step o)) for Procatalysts A, B, C, & D

This constitutes the first part of phase A of the process for preparation of the procatalyst as discussed above.

Step o) was carried out to prepare a phenyl magnesium chloride (PhMgCl) Grignard reagent. The following steps were carried out.

A three-necked flask, fitted with a reflux condenser and a funnel, was filled with magnesium powder (24.3 g, 1.0 mol). The flask was brought under nitrogen atmosphere. The magnesium powder was heated at 80° C. for 1 hour, after which a mixture of dibutyl ether (170 ml) and chlorobenzene (60 ml) was added.

Following, iodine (0.03 g) and n-chlorobutane (3 ml) were successively added to the reaction mixture to provide a colored reaction mixture. After the color of the iodine had disappeared, the temperature of the reaction mixture was raised to 97° C. After that additional chlorobenzene (220 ml) was slowly added during a period of 2.5 hours. The resulting dark reaction mixture that was formed in the process was stirred for another 8 hours at a temperature of 97° C. Subsequently, the stirring and heating were stopped and the solid material was allowed to settle during a period of 48 hours. By decanting the solution above the precipitate a solution with a concentration of 1.36 mol/l of the soluble Grignard reagent was obtained. This solution was used in the following step.

Preparation of Butyl-Grignard Reagent (Step o)) for Procatalyst E

This constitutes the first part of phase A of the process for preparation of the procatalyst as discussed above.

Step o) is carried out to prepare a butyl magnesium chloride (BuMgCl) Grignard reagent. The following steps are carried out.

A stirred flask, fitted with a reflux condenser and a funnel, was filled with magnesium powder (24.3 g). The flask was brought under nitrogen. The magnesium was heated at 80° C. for 1 hour, after which dibutyl ether (150 ml), iodine (0.03 g) and n-chlorobutane (4 ml) were successively added. After the colour of the iodine had disappeared, the temperature was raised to 80° C. and a mixture of n-chlorobutane (110 ml) and dibutyl ether (750 ml) was slowly added for 2.5 hours. The reaction mixture was stirred for another 3 hours at 80° C. Then the stirring and heating were stopped and the small amount of solid material was allowed to settle for 24 hours. By decanting the colourless solution above the precipitate, a solution of butylmagnesiumchloride with a concentration of 1.0 mol Mg/l was obtained.

Preparation of Solid Magnesium Compound (Step i)) for Procatalysts A, B, C, and D This constitutes the second part of phase A of the process for preparation of the procatalyst as discussed above.

The solution of soluble Grignard reagent obtained in step o) (200 ml, 0.272 mol Mg) was cooled to 15° C. Separately, 100 ml of a solution of tetraethoxysilane (TES, 33.4 ml) in dibutyl ether (DBE, 66.6 ml) was cooled to 15° C. Subsequently, both cooled solutions were dosed simultaneously to a mixing device (minimixer) of 0.45 ml volume supplied with a stirrer and cooling jacket. The stirring speed in the mixing device was set at 1000 rpm. The mixing device was cooled to 10° C. by means of cold water circulating in its jacket. The contact time between the Grignard reagent and TES was 13 second in the mixing device and the tube connecting the mixing device with the reactor.

A 0.7 l reactor with a stirrer was loaded with 100 ml of DBE, and cooled to 5° C. The mixture formed in the mixing was introduced—via the connecting tube—to the reactor while stirring at a speed of 200 rpm. Dosing time was 1 hour.

On completion of the dosing the obtained reaction mixture was kept at 5° C. for 0.5 hour. Following, the reacting mixture was heated to 60° C. and kept at this temperature for 1 hour. Then the stirring was stopped and the solid substance was allowed to settle. The supernatant was removed by decanting. The solid substance was washed three times using 300 ml of heptane. As a result, a pale yellow solid substance, the solid magnesium support, was obtained. This first intermediate reaction product was suspended in 110 ml of heptane.

Preparation of Solid Magnesium Compound (Step i)) for Procatalyst E

This constitutes the second part of phase A of the process for preparation of the procatalyst as discussed above. This step is carried out similar to the preparation of the solid magnesium compound for Procatalysts A,B, C, and D with the difference that a solution of butyl Grignard reagent is used instead of phenyl Grignard reagent. As a result, the solid magnesium support, is obtained. This first intermediate reaction product is suspended in 110 ml of heptane.

Activation of First Intermediate Reaction Product

This constitutes phase B of the process for preparation of the procatalyst as discussed above.

In an inert nitrogen atmosphere at 20° C. a 250 ml glass flask equipped with a mechanical agitator is filled with a slurry of 5 g of second intermediate reaction product dispersed in 60 ml of heptane. Subsequently, a solution of 0.22 ml ethanol (EtOH/mg=0.1) in 20 ml heptane is dosed under stirring during 1 hour. After keeping the reaction mixture at 20° C. for 30 min, a solution of 0.79 ml titanium tetraethoxide (TET/Mg=0.1) in 20 ml of heptane was added for 1 hour. The slurry was slowly allowed to warm up to 30° C. for 90 min and kept at that temperature for another 2 hours. Finally, the supernatant liquid is decanted from the solid second intermediate reaction product which was washed once with 90 ml of heptane at 30° C.

Preparation of Procatalyst A (Not According to the Present Invention).

This constitutes phase C of the process for preparation of the procatalyst as discussed above. Phase D is not carried out so a procatalyst not according to the invention is obtained.

A reactor was brought under nitrogen atmosphere and 125 ml of titanium tetrachloride was added to it. The reactor was heated to 110° C. and a suspension, containing about 5 g of third intermediate reaction product in 15 ml of heptane, was added to it under stirring (speed of stirring 100 rpm). Then the reaction mixture was kept at 110° C. for 15 min and 2 ml of di-isobutyl phthalate (DIBP—internal electron donor) was added to reactor and then the temperature was raised to 115° C.

Following, the reaction mixture was kept at 115° C. for 105 min. Then the stirring was stopped and the solid substance was allowed to settle. The supernatant was removed by decanting, after which the solid product was washed with chlorobenzene (125 ml) at 100° C. for 20 min. Then, the washing solution was removed by decanting after which a second mixture of titanium tetrachloride (62.5 ml) and chlorobenzene (62.5 ml) was added. The reaction mixture was kept at 115° C. for 30 min, after which the solid substance was allowed to settle and the supernatant was removed by decanting, and the last treatment was repeated once again. Thus in total, the titanation treatment comprises three phases of addition of titanium tetrachloride. Or, in other words, step iii) of contacting the solid support is carried out three times. The solid substance obtained was washed five times using 150 ml of heptane at 60° C., after which the comparative procatalyst A, suspended in heptane, was obtained.

Preparation of Procatalyst B.

This constitutes phases C and D of the process for preparation of the procatalyst as discussed above.

Step iii) was carried out as follows: a reactor was brought under nitrogen atmosphere and 125 ml of titanium tetrachloride was added to it. The reactor was heated to 110° C. and a suspension, containing about 5 g of second intermediate reaction product in 15 ml of heptane, was added to it under stirring (speed of stirring 100 rpm). Then the reaction mixture was kept at 110° C. for 15 min and 2 ml of di-isobutyl phthalate (DIBP—internal electron donor) was added to reactor and then raise temperature to 115° C. Thus, the third intermediate reaction product is obtained which is not isolated prior to the next reaction step.

Following, the reaction mixture was kept at 115° C. for 105 min. Then the stirring was stopped and the solid substance was allowed to settle. The supernatant was removed by decanting, after which the solid product (third intermediate reaction product) was washed with chlorobenzene (125 ml) at 100° C. for 20 min. Then, the washing solution was removed by decanting, then 125 ml of chlorobenzene were added to the reactor, after which the reaction mixture was heated to 100° C.

Step iv) was carried out directly after step iii) in the same reactor. For step iv) 15 ml of a mixture of aluminum trichloride (50 mg, 1 wt. %) as modifier and 15 ml of chlorobenzene (in a wt/vol ratio of 50 mg:15 ml) was added to the reactor and allowed to react for 1 h. The reaction was stirred (speed of stirring 100 rpm). Then the stirring was stopped and the solid substance (modified intermediate reaction product) was allowed to settle.

Step v) was carried out directly after step iv) in the same reactor. For step v) the supernatant was removed by decanting, after which a mixture of titanium tetrachloride (62.5 ml) and chlorobenzene (62.5 ml) was added. The reaction mixture was kept at 115° C. for 30 min, after which the solid substance was allowed to settle, and the last treatment was repeated once again. Thus in total, the titanation treatment comprises three phases of addition of titanium tetrachloride wherein the first phase of addition is separated from the second and third phase of addition by the modification with aluminum halide. The solid substance obtained was washed five times using 150 ml of heptane at 60° C., after which the procatalyst according to the present invention, suspended in heptane, was obtained.

Preparation of Procatalyst C (Not According to the Present Invention)

This constitutes phase C of the process for preparation of the procatalyst as discussed above. Phase D is not carried out so a procatalyst not according to the invention is obtained. During step iii) being the first titanation step an activator, being ethyl benzoate (EB) was added.

Step iii) was carried out as follows: a reactor was brought under nitrogen atmosphere and 62.5 ml of titanium tetrachloride was added to it. The reactor was heated to 100° C. and a suspension, containing about 2.75 g of second intermediate reaction product (comprising 17.3 wt. % of Mg) in 7.5 ml of heptane, was added to it under stirring (speed of stirring 100 rpm). Then the reaction mixture was kept at 100° C. for 10 min and 0.39 ml of activator (ethyl benzoate) was added. The reactor was kept at 100° C. for 60 min until activation is ready. The third intermediate reaction product is allowed to settle and the solvent is decanted. The third intermediate reaction product is washed with 62.5 ml of chlorobenzene at 100° C. for 15-20 min. The third intermediate reaction product is allowed to settle and the solvent is decanted. Thus, the third intermediate reaction product is obtained which is not isolated prior to the next reaction step.

Step v) was carried out directly after step iii) in the same reactor. For step v) a mixture of 31.25 ml of titanium tetrachloride and 31.25 ml of chlorobenzene were added. The reactor is heated to 115° C. Then 0.3 gram of 4-[benzoyl (methyl)amino]pentan-2-yl benzoate (AB—internal electron donor; AB/Mg ratio=0.05) in 2 ml of chlorobenzene was added to the reactor and kept at a temperature of 115° C. The solid product is allowed to settle and the solvent is decanted. The last titanation treatment was repeated once again using a mixture of 31.25 ml of titanium tetrachloride and 31.25 ml of chlorobenzene. This was kept at 115° C. during 30 minutes under stirring. The procatalyst was allowed to settle and the solvent was decanted. The procatalyst was washed five times using 100-150 ml of heptane for each wash step. The washing was carried out at 60° C. The resulting procatalyst C comprises 10.1 wt. % of internal donor AB and 3.0 wt. % of ethylbenzoate.

Preparation of Procatalyst D

This constitutes phases C and D of the process for preparation of the procatalyst as discussed above. During step iii) being the first titanation step an activator, being ethylbenzoate (EB) was added.

Step iii) was carried out as follows: a reactor was brought under nitrogen atmosphere and 62.5 ml of titanium tetrachloride was added to it. The reactor was heated to 100° C. and a suspension, containing about 2.75 g of second intermediate reaction product (comprising 17.3 wt. % of Mg) in 7.5 ml of heptane, was added to it under stirring (speed of stirring 100 rpm). Then the reaction mixture was kept at 100° C. for 10 min and 0.39 ml of activator (ethyl benzoate) was added. The reactor was kept at 100° C. for 60 min until activation is ready. The third intermediate reaction product is allowed to settle and the solvent is decanted. The third intermediate reaction product is washed with 62.5 ml of chlorobenzene at 100° C. for 15-20 min. The third intermediate reaction product is allowed to settle and the solvent is decanted. Thus, the third intermediate reaction product is obtained which is not isolated prior to the next reaction step.

Step iv) was carried out directly after step iii) in the same reactor. For step iv) 47.5 chlorobenzene was added to the reactor. Subsequently, 27.5 mg of aluminum trichloride dissolved in 15 ml of chlorobenzene as modifier was added to the reactor and allowed to react for 1 h at 100° C. The reaction was stirred (speed of stirring 100 rpm). Then the stirring was stopped and the solid substance (modified intermediate reaction product) was allowed to settle.

Step v) was carried out directly after step iv) in the same reactor. For step v) a mixture of 31.25 ml of titanium tetrachloride and 31.25 ml of chlorobenzene were added. The reactor is heated to 115° C. Then 0.3 gram of 4-[benzoyl (methyl)amino]pentan-2-yl benzoate (AB—internal electron donor; AB/Mg ratio=0.05) in 2 ml of chlorobenzene was added to the reactor and kept at a temperature of 115° C. The solid product is allowed to settle and the solvent is decanted. The last titanation treatment was repeated once again using a mixture of 31.25 ml of titanium tetrachloride and 31.25 ml of chlorobenzene. This was kept at 115° C. during 30 minutes under stirring. The procatalyst was allowed to settle and the solvent was decanted. The procatalyst was washed five times using 100-150 ml of heptane for each wash step. The washing was carried out at 60° C. The resulting procatalyst D comprises 9.6 wt. % of internal donor AB and 2.7 wt. % of ethylbenzoate.

Thus in total, the titanation treatment comprises three phases of addition of titanium tetrachloride wherein the first phase of addition is separated from the second and third phase of addition by the modification with aluminum halide. The solid substance obtained was washed five times using 150 ml of heptane at 60° C., after which the procatalyst according to the present invention, suspended in heptane, was obtained.

Preparation of Procatalyst E

This constitutes phases C and D of the process for preparation of the procatalyst as discussed above.

During step iii) being the first titanation step an activator, being ethylbenzoate (EB) was added.

Step iii) was carried out as follows: a reactor was brought under nitrogen atmosphere and 125 ml of titanium tetrachloride was added to it. The reactor was heated to 100° C. and a suspension, containing about 5.5 g of second intermediate reaction product (comprising 15 wt. % of Mg) in 15 ml of heptane, was added to it under stirring (speed of stirring 100 rpm) at a temperature of 100° C. Then the reaction mixture was heated to 110° C. and stirred for 10 minutes. Subsequently, 0.88 gram of activator (ethyl benzoate) was added in 2 ml chlorobenzene (EB/Mg=0.15 mol). The reactor was kept at 110° C. for 60 min until activation is ready. The reaction product is allowed to settle and the solvent is decanted. The reaction product is washed with 125 ml of chlorobenzene at 100° C. for 15-20 min. The third intermediate reaction product is allowed to settle and the solvent is decanted. Without prior isolation the next step is carried out.

Step v) was carried out directly after step iii) in the same reactor.

In step v) 62.5 ml of titanium tetrachloride and 62.5 ml of chlorobenzene were added. The reactor was kept at 115° C. for 30 min under stirring. The reaction product is allowed to settle and the solvent is decanted. Again 62.5 ml of titanium tetrachloride and 62.5 ml of chlorobenzene were added. The reactor was kept at 115° C. Then 0.51 gram of 4-[benzoyl (methyl)-amino]pentan-2-yl benzoate (AB—internal electron donor; molar ratio AB/Mg=0.04) in 2 ml of chlorobenzene. The reactor is kept at 115° C. for 30 min under stirring. The solid product is allowed to settle and the solvent is decanted.

Step iv) was carried out directly after step v) in the same reactor. For step iv) 62.5 ml of titanium tetrachloride and 62.5 ml of chlorobenzene were added to the reactor and heated to 115° C. Subsequently, 15 ml chlorobenzene containing 55 mg aluminum trichloride in chlorobenzene as modifier was added to the reactor and allowed to react for 1 h at 100° C. under stirring. The reaction was stirred (speed of stirring 100 rpm). Then the stirring was stopped and the solid substance (modified intermediate reaction product) was allowed to settle. Additional 62.5 ml of titanium chloride and 62.5 ml of chlorobenzene were added. The reactor was kept at 115° C. Then 7.5 ml chlorobenzene containing 27.5 mg of anhydrous aluminum trichloride in chlorobenzene as modifier was added and allowed to react for 30 minutes under stirring.

The procatalyst was allowed to settle and the solvent was decanted. The procatalyst was washed five times using 100-150 ml of heptane for each wash step. The washing was carried out at 60° C.

The resulting procatalyst E comprises 5.4 wt. % of internal donor AB and 2.7 wt. % of ethylbenzoate.

Thus in total, the titanation treatment comprises five phases of addition of titanium tetrachloride. The fourth and fifth phases of addition where together with the modification with aluminum halide.

The compositions of the procatalysts A, B, C, and E is shown in Table 1 below. It should be noted that the magnesium is from the solid support, the titanium is from the titanation treatment and the aluminum is from the inventive modification step. Magnesium (Mg), Titanium (Ti) and Aluminum (Al) content was measured using method ICP and is given in wt. % based on the total weight of the procatalyst.

TABLE 1

Composition of Procatalysts

| | Cat. Comp. A | Cat. Comp. B | Cat. Comp. C | Cat. Comp. D | Cat. Comp. E |
|---|---|---|---|---|---|
| Mg (wt. %) | 18.89 | 19.32 | 18.43 | 19.22 | 20.8 |
| Ti (wt. %) | 1.87 | 1.83 | 2.42 | 2.01 | 2.7 |
| Al (wt. %) | 0 | 0.17 | 0 | 0.06 | 0.11 |

Table 1 clearly shows the effect of the present invention, being the incorporation of aluminum due to the modification step.

Polymerization of Propylene

Polymerization of propylene was carried out in a stainless steel reactor (with a volume of 3 l) in propylene (1.375 kg) at a temperature of 67° C., total pressure 24 bar and hydrogen presence (200 psi) for 1 hour in the presence of a catalyst system comprising the procatalyst (A or B), triethylaluminum (TEAL as the co-catalyst) and cyclohexylmethyldimethoxysilane (as the external electron donor which is a so-called C-donor or carbon donor). The amount of the procatalyst used was 0.025 g, the amount of triethylaluminum was 2.0 mmol and the concentration of cyclohexylmethyldimethoxysilane was 50 µl.

Table 2 below summarizes the results of the polymer products obtained in the polymerization.

The productivity of the polymerization is expressed as kilogram of polymer isolated per gram of catalyst after 60 minutes of polymerization time. (kg PP/g.cat.h)

$M_w/M_n$: Polymer molecular weight and its distribution (MWD) were determined according to method i) described above.

TABLE 2 polymer products obtained in polymerization

| | Procatalyst | | | | |
|---|---|---|---|---|---|
| | Cat. Comp. A | Cat. Comp. B | Cat. Comp. C | Cat. Comp. D | Cat. Com. E |
| Internal donor | DIBP | DIBP | AB | AB | AB |
| Productivity | 29 | 34 | 30 | 36 | 34 |
| Bulk density | 410 | 460 | 413 | 455 | 410 |
| XS wt. % | 2.1 | 2.2 | 3.51 | 3.9 | 4.5 |
| MWD | 4.1 | 4.5 | 7.9 | 6.4 | 7.4 |
| $M_n$ | 77,000 | 74,000 | 73,500 | 77,500 | |
| $M_w$ | 316,000 | 327,000 | 582,000 | 498,500 | |

As can be seen from the above table, when using the process of the invention, an improved catalyst having a higher productivity can be obtained (viz. an increase in activity from 29 to 34 for DIBP as internal donor and from 30 to 36 for AB as internal donor).

Furthermore, it can be seen that the polyolefin produced using said improved catalyst has an increased bulk density.

Thus, it has been shown that the procatalyst of the present invention is capable of increasing the activity of homo polypropylene production by 17% (from 29 to 34) and the polymer bulk density by 12% (from 410 to 460). Moreover, the procatalyst according to the present invention shows a higher sensitivity for ethylene incorporation for the production of random polypropylene. Thus, one or more of the objections of the present invention are achieved by the present procatalyst. More embodiments are disclosed in the appended claims.

The invention claimed is:

1. A process for preparing a procatalyst for preparing a catalyst composition for olefin polymerization, said process comprising:
  i) contacting a compound $R^4_z MgX^4_{2-z}$ with an alkoxy- or aryloxy-containing silane compound to give a first intermediate reaction product, being a solid $Mg(OR^1)_x X^1_{2-x}$, wherein: $R^4$ is the same as $R^1$ being a linear, branched or cyclic hydrocarbyl group independently selected from alkyl, alkenyl, aryl, aralkyl, or alkylaryl groups, and one or more combinations thereof; wherein said hydrocarbyl group may be substituted or unsubstituted, may contain one or more heteroatoms; $X^4$ and $X^1$ are each independently selected from the group consisting of fluoride (F−), chloride (Cl−), bromide (Br−) or iodide (I−); z is in a range of larger than 0 and smaller than 2, being 0<z<2; x is in a range of larger than 0 and smaller than 2, being 0<x<2;
  ii) optionally contacting the solid $Mg(OR^1)_x X^1_{2-x}$ obtained in step i) with at least one activating compound selected from the group formed by activating electron donors and metal alkoxide compounds of formula $M^1(OR^2)_{v-w}(OR^3)_w$ or $M^2(OR^2)_{v-w}(R^3)_w$, to obtain a second intermediate reaction product; wherein: $M^1$ is a metal selected from the group consisting of Ti, Zr, Hf, Al or Si; $M^2$ is a metal being Si; v is the valency of $M^1$ or $M^2$; w is smaller than v; $R^2$ and $R^3$ are each a linear, branched or cyclic hydrocarbyl group independently selected from alkyl, alkenyl, aryl, aralkyl, alkoxycarbonyl or alkylaryl groups, and one or more combinations thereof; wherein said hydrocarbyl group may be substituted or unsubstituted, may contain one or more heteroatoms;

iii) contacting the first or second intermediate reaction product obtained in step i) or ii) respectively, with a halogen-containing titanium compound and either an activator or an internal electron donor to obtain a third intermediate reaction product;

iv) modifying the third intermediate reaction product obtained in step iii) with a modifier having the formula $M(p)X_p$, wherein M is selected from the group consisting of aluminum, boron, gallium, zinc, copper, thallium, indium, vanadium, chromium and iron, p is the oxidation state of M, and wherein X is a halide, to yield a modified intermediate reaction product; and v) contacting said modified intermediate reaction product obtained in step iv) with a halogen-containing titanium compound and, in the case that in step iii) an activator was used, an internal donor to obtain the procatalyst.

2. The process according to claim 1, wherein the activator added during step iii) is selected from the group consisting of alkylbenzoate, benzamide, and monoester.

3. The process according to claim 1, wherein the activator added during step iii) is ethylbenzoate and the internal donor used during step v) is 4-[benzoyl(methyl)amino]pentan-2-yl benzoate.

4. The process according to claim 1, wherein during step iv) aluminum halide is used as the modifier.

5. The process according to claim 1, wherein the compound of formula $R^4MgX^4_{2-z}$ used in step i), the halogen-containing titanium compound used in step iii) and step v) and the modifier used in step iv) are used in such amounts that the resulting procatalyst comprises in wt. % based on the total weight of the procatalyst: magnesium: from 15 to 24; titanium: from 1 to 4; modifier: from 0.05 to 2.0.

6. The process according to claim 1, wherein step ii) is carried out using a combination of an alcohol and an tetra alkoxy titanium compound, as the activating compounds.

7. The process according to claim 1, wherein steps iii), iv) and v) are carried out in the same reactor.

8. The process according to claim 1, wherein the internal donor used during step iii) or step v) is selected from the group consisting of dicarboxylic acid esters according to Formula VI and aminobenzoates according to formula XI:

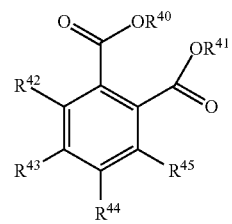

Formula VI

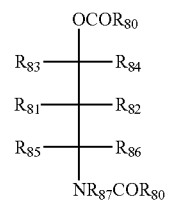

Formula XI wherein $R^{40}$ and $R^{41}$ are each independently a linear, branched or cyclic, and substituted or unsubstituted hydrocarbyl group selected from alkyl, alkenyl, aryl, aralkyl, alkoxycarbonyl or alkylaryl groups, and one or more combinations thereof; and wherein $R^{42}$, $R^{43}$, $R^{44}$, $R^{45}$ are each independently selected from hydrogen, a halide or a linear, branched or cyclic, and a substituted or unsubstituted hydrocarbyl group and one or more combinations thereof; wherein $R^{80}$ is a substituted or unsubstituted aromatic group, selected from aryl or alkylaryl groups, having from 6 to 20 carbon atoms; $R^{81}$, $R^{82}$, $R^{83}$, $R^{84}$, $R^{85}$, and $R^{86}$ are each independently selected from hydrogen or a linear, branched or cyclic, and substituted or unsubstituted hydrocarbyl group and one or more combinations thereof.

9. The process according to claim 5, wherein the resulting procatalyst comprises in wt. % based on the total weight of the procatalyst: magnesium: from 19.0 to 19.5; titanium: from 1.5 to 3.5; Group 13 or transition metal: from 0.1 to 0.4.

* * * * *